US010926516B2

(12) United States Patent
Karagiannis et al.

(10) Patent No.: US 10,926,516 B2
(45) Date of Patent: *Feb. 23, 2021

(54) POLYMERIC INTERLAYERS AND MULTIPLE LAYER PANELS MADE THEREFROM EXHIBITING ENHANCED PROPERTIES AND PERFORMANCE

(71) Applicant: Solutia Inc., St. Louis, MO (US)

(72) Inventors: Aristotelis Karagiannis, Amherst, MA (US); Yalda Farhoudi, Longmeadow, MA (US); Yinong Ma, Longmeadow, MA (US); Megan Lee Szlosek, Belchertown, MA (US); Pu Zhang, Suffield, CT (US)

(73) Assignee: Solutia Inc., St. Louis, MO (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/591,402

(22) Filed: May 10, 2017

(65) Prior Publication Data
US 2017/0361593 A1   Dec. 21, 2017

Related U.S. Application Data

(60) Provisional application No. 62/352,574, filed on Jun. 21, 2016.

(51) Int. Cl.
| | |
|---|---|
| *B32B 17/10* | (2006.01) |
| *B32B 27/30* | (2006.01) |
| *B32B 27/22* | (2006.01) |
| *B32B 27/32* | (2006.01) |
| *B32B 27/08* | (2006.01) |
| *B32B 3/26* | (2006.01) |
| *B32B 27/38* | (2006.01) |
| *B32B 27/40* | (2006.01) |
| *B32B 23/20* | (2006.01) |
| *B32B 23/08* | (2006.01) |
| *B32B 25/08* | (2006.01) |
| *B32B 27/42* | (2006.01) |
| *B32B 25/20* | (2006.01) |

(52) U.S. Cl.
CPC ........ *B32B 17/10761* (2013.01); *B32B 3/263* (2013.01); *B32B 23/08* (2013.01); *B32B 23/20* (2013.01); *B32B 25/08* (2013.01); *B32B 25/20* (2013.01); *B32B 27/08* (2013.01); *B32B 27/22* (2013.01); *B32B 27/304* (2013.01); *B32B 27/306* (2013.01); *B32B 27/308* (2013.01); *B32B 27/32* (2013.01); *B32B 27/38* (2013.01); *B32B 27/40* (2013.01); *B32B 27/42* (2013.01); *B32B 2250/03* (2013.01); *B32B 2250/40* (2013.01); *B32B 2270/00* (2013.01); *B32B 2307/542* (2013.01); *B32B 2307/546* (2013.01); *B32B 2309/02* (2013.01); *B32B 2309/105* (2013.01); *B32B 2419/00* (2013.01); *B32B 2605/006* (2013.01)

(58) Field of Classification Search
CPC . B32B 17/10761; B32B 27/306; B32B 27/22; C08L 29/14
See application file for complete search history.

(56) References Cited

U.S. PATENT DOCUMENTS

| | | | |
|---|---|---|---|
| 2,282,026 A | 5/1942 | Bozetech et al. | |
| 2,282,057 A | 5/1942 | Hopkins et al. | |
| 2,526,728 A | 10/1950 | Burk | |
| 3,178,833 A | 4/1965 | Gulbransen, Jr. | |
| 5,482,767 A | 1/1996 | Karagiannis | |
| 5,529,848 A | 6/1996 | D'Errico | |
| 5,631,315 A | 5/1997 | D'Errico | |
| 6,559,212 B1 | 5/2003 | D'Errico et al. | |
| 6,579,608 B1 | 6/2003 | Kondo | |
| 6,737,159 B2 | 5/2004 | Garrett et al. | |
| 6,887,577 B1 | 5/2005 | Keller et al. | |
| 6,921,509 B2 | 7/2005 | Moran | |
| 6,939,612 B2 | 9/2005 | Reyntjens | |
| 6,984,679 B2 * | 1/2006 | Papenfuhs | ........ B32B 17/10761 524/284 |
| 7,041,375 B2 | 5/2006 | Chen | |
| 7,214,433 B2 | 5/2007 | Wong | |
| 7,238,427 B2 | 7/2007 | Ma | |
| 7,279,516 B2 | 10/2007 | D'Errico | |
| 7,468,209 B2 | 12/2008 | Toyama et al. | |
| 7,510,771 B2 | 3/2009 | Lu | |
| 7,563,516 B2 | 7/2009 | Matsudo | |
| 7,842,395 B2 | 11/2010 | Lu et al. | |
| 7,854,993 B2 | 12/2010 | Lu | |
| 7,858,683 B2 | 12/2010 | Toyama et al. | |

(Continued)

FOREIGN PATENT DOCUMENTS

| | | |
|---|---|---|
| WO | WO 2001 043963 A1 | 6/2001 |
| WO | WO 2003 097347 A1 | 11/2003 |
| WO | WO 2013 134599 A1 | 9/2013 |
| WO | WO 2016 094213 A1 | 6/2016 |
| WO | WO 2016 094219 A1 | 6/2016 |

OTHER PUBLICATIONS

Notification of Transmittal of the International Search Report and the Written Opinion of the International Searching Authority, or the Declaration received in International Application No. PCT/US2017/036484 dated Jan. 19, 2018.

(Continued)

*Primary Examiner* — Prashant J Khatri
(74) *Attorney, Agent, or Firm* — Michelle Bugbee

(57) ABSTRACT

Polymeric interlayers for use in making multiple layer panels having a unique balance of properties are provided. Single and multiple layer interlayers according to various embodiments of the present invention can be used to form multiple layer panels that exhibit both enhanced rigidity and improved impact resistance, while still retaining desirable optical performance. Interlayers and multiple layer panels of the present invention may be particularly suitable for use in a wide range of applications, including, for example, in many indoor and outdoor architectural and structural applications.

14 Claims, No Drawings

(56) References Cited

U.S. PATENT DOCUMENTS

| | | |
|---|---|---|
| 8,278,379 B2 | 10/2012 | Toyama et al. |
| 8,304,082 B2 | 11/2012 | Hatta et al. |
| 8,431,047 B2 | 4/2013 | Ootsuki et al. |
| 8,551,621 B2 | 10/2013 | Matsuda et al. |
| 8,597,792 B2 | 12/2013 | Meise et al. |
| 8,628,856 B2 | 1/2014 | Iwamoto |
| 8,632,887 B2 | 1/2014 | Iwamoto |
| 8,715,815 B2 | 5/2014 | Shimamoto et al. |
| 8,722,194 B2 | 5/2014 | Asanuma |
| 8,734,937 B2 | 5/2014 | Iwamoto |
| 8,741,438 B2 | 6/2014 | Keller |
| 8,741,439 B2 | 6/2014 | Shimamoto et al. |
| 8,753,747 B2 | 6/2014 | Iwamoto et al. |
| 8,790,784 B2 | 7/2014 | Shimamoto et al. |
| 8,795,821 B2 | 8/2014 | Shimamoto et al. |
| 8,883,317 B2 | 11/2014 | Matsuda et al. |
| 8,933,166 B2 | 1/2015 | Rukavina |
| 8,986,848 B2 | 3/2015 | Nueraji et al. |
| 9,012,538 B2 | 4/2015 | Edelmann et al. |
| 9,032,692 B2 | 5/2015 | Radhakrishnan et al. |
| 9,382,355 B2 | 7/2016 | Cui et al. |
| 2005/0032950 A1 | 2/2005 | Lee et al. |
| 2005/0118445 A1 | 6/2005 | Wong |
| 2005/0131133 A1 | 6/2005 | Wong et al. |
| 2005/0170160 A1 | 8/2005 | Moran et al. |
| 2005/0192398 A1 | 9/2005 | Wong et al. |
| 2005/0196625 A1 | 9/2005 | Toyama et al. |
| 2006/0210776 A1 | 9/2006 | Lu |
| 2007/0014976 A1 | 1/2007 | Matsudo |
| 2007/0071983 A1 | 3/2007 | Haldeman |
| 2007/0122629 A1 | 5/2007 | Chen |
| 2008/0268270 A1 | 10/2008 | Chen |
| 2010/0028642 A1* | 2/2010 | Steuer ............... B32B 17/10761 428/220 |
| 2010/0086788 A1 | 4/2010 | Tsuji et al. |
| 2010/0209716 A1 | 8/2010 | Fukatani et al. |
| 2010/0233453 A1 | 9/2010 | Hashimoto |
| 2011/0070415 A1 | 3/2011 | Nakamura |
| 2012/0135191 A1 | 5/2012 | Spangler et al. |
| 2013/0074910 A1* | 3/2013 | Isoue ............... B32B 17/10036 136/251 |
| 2013/0074931 A1 | 3/2013 | Chen |
| 2013/0075949 A1 | 3/2013 | Chen |
| 2013/0149503 A1 | 6/2013 | Yamamoto et al. |
| 2013/0183507 A1 | 7/2013 | Matsuda et al. |
| 2013/0202863 A1 | 8/2013 | Shimamoto et al. |
| 2013/0236693 A1 | 9/2013 | Lu |
| 2013/0236711 A1 | 9/2013 | Lu |
| 2013/0295357 A1 | 11/2013 | Cleary et al. |
| 2013/0312898 A1 | 11/2013 | Bourcier et al. |
| 2014/0014178 A1 | 1/2014 | Muguruma |
| 2014/0017476 A1 | 1/2014 | Bourcier et al. |
| 2014/0150866 A1 | 6/2014 | Muguruma |
| 2014/0199534 A1 | 7/2014 | Shimamoto et al. |
| 2014/0224423 A1 | 8/2014 | Keller |
| 2014/0227536 A1 | 8/2014 | Iwamoto |
| 2014/0295192 A1 | 10/2014 | Fukatani |
| 2014/0315028 A1 | 10/2014 | Shimamoto et al. |
| 2014/0349124 A1 | 11/2014 | Shimamoto et al. |
| 2014/0363644 A1 | 12/2014 | Lu |
| 2014/0363651 A1 | 12/2014 | Lu |
| 2014/0363652 A1 | 12/2014 | Lu |
| 2014/0364549 A1 | 12/2014 | Lu |
| 2014/0364550 A1 | 12/2014 | Lu |
| 2015/0030860 A1 | 1/2015 | Shimamoto et al. |
| 2015/0079373 A1 | 3/2015 | Lu |
| 2015/0240067 A1 | 8/2015 | Nagai |
| 2016/0046783 A1 | 2/2016 | Asanuma |
| 2016/0046784 A1 | 2/2016 | Asanuma |
| 2016/0159048 A1 | 6/2016 | Ukidwe et al. |
| 2016/0160032 A1 | 6/2016 | Ukidwe et al. |
| 2017/0334173 A1 | 11/2017 | Yui et al. |

OTHER PUBLICATIONS

Wade, B.; "Vinyl Acetal Polymers"; Encyclopedia of Polymer Science and Technology; 2016; 22 pages (online, copyright 2016 John Wiley & Sons, Inc.).

Co-pending U.S. Appl. No. 15/591,438, filed May 10, 2017; Karagiannis, et al.

Co-pending U.S. Appl. No. 15/591,465, filed May 10, 2017; Karagiannis, et al.

Co-pending U.S. Appl. No. 15/591,334, filed May 10, 2017; Karagiannis, et al.

Co-pending U.S. Appl. No. 15/591,440, filed May 10, 2017; Karagiannis, et al.

Wypych, G.; "Chapter 12: Effect of Nucleating Agents on Physical-Mechanical Properties"; Handbook of Nucleating Agents; 2016; pp. 205-215.

* cited by examiner

POLYMERIC INTERLAYERS AND MULTIPLE LAYER PANELS MADE THEREFROM EXHIBITING ENHANCED PROPERTIES AND PERFORMANCE

CROSS REFERENCE TO RELATED APPLICATION(S)

This claims the benefit of U.S. Provisional Patent Application Ser. No. 62/352,574, filed Jun. 21, 2016, the entire disclosure of which is incorporated by reference herein.

BACKGROUND

1. Field of the Invention

This disclosure relates to polymeric sheets and, in particular, to polymeric sheets suitable for use as single or multiple layer interlayers, including those utilized in multiple layer panels.

2. Description of Related Art

Poly(vinyl butyral) (PVB) is often used in the manufacture of polymer sheets that can be used as interlayers in multiple layer panels formed by sandwiching the interlayer between two panes of glass. Such laminated multiple layer panels are commonly referred to as "safety glass" and have use in both architectural and automotive applications. One of the primary functions of the interlayer in a safety glass panel is to absorb energy resulting from impact to the panel without allowing penetration of an object through the glass. The interlayer also helps keep the glass bonded when the applied force is sufficient to break the glass in order to prevent the glass from forming sharp pieces and scattering. Additionally, the interlayer can also provide the laminated panel with a higher sound insulation rating, reduce ultraviolet (UV) and/or infrared (IR) light transmission through the panel, and enhance its aesthetic appeal through the addition of color, textures, etc.

Often, when an interlayer exhibits a desirable property, such as rigidity, it may lack other desirable or important properties, such as impact resistance or optical clarity. In some applications safety glass panels may be used as a structural element, but may also be required to impart aesthetic characteristics to the application. In such cases, an optimal optical performance, rigidity, and impact resistance is not only desirable, but required. Unfortunately, as the rigidity of conventional interlayers is increased, the impact resistance of the resulting panel worsens. Similarly, conventional interlayers formulated for enhanced impact strength often lack necessary rigidity that is required in many applications, such as applications requiring excellent structural support properties.

Thus, a need exists for polymeric interlayers that exhibit strength and rigidity, while still providing sufficient impact resistance. Ideally, such interlayers would also exhibit desirable optical properties, such as low haze and no yellowing. Desirably, these interlayers could be used in multiple layer panels for a wide range of applications, including architectural applications, and would provide an optimized balance of structural, performance, and aesthetic properties.

SUMMARY

One embodiment of the present invention concerns a monolithic interlayer comprising: a single polymer layer comprising at least one poly(vinyl acetal) resin and at least one plasticizer, wherein said poly(vinyl acetal) resin has a residual hydroxyl content of at least 19 weight percent, wherein said polymer layer has a plasticizer content of not more than 30 phr and a glass transition temperature greater than 43° C.

Another embodiment of the present invention concerns a monolithic interlayer comprising: a single polymer layer comprising at least one poly(vinyl acetal) resin and at least one plasticizer, wherein at least two of the following criteria (i) through (iii) below are true—(i) said poly(vinyl acetal) resin has a residual hydroxyl of at least 19 weight percent; (ii) said polymer layer has a plasticizer content of less than 30 phr; and (iii) said polymer layer has a glass transition temperature greater than 43° C., and wherein when said interlayer is laminated between two sheets of glass each having a thickness of 2.3 mm to form a laminate, the laminate has a mean break height, measured according to ANSI/SAE Z26.1-1996 at a temperature of 70° F. and an interlayer thickness of 30 mils, of at least 14 feet.

Yet another embodiment of the present invention concerns a monolithic interlayer comprising: a single polymer layer comprising at least one poly(vinyl acetal) resin and at least one plasticizer, wherein said poly(vinyl acetal) resin has a residual hydroxyl content of at least 24 weight percent, wherein said polymer layer has a plasticizer content of from about 5 to about 30 phr and a glass transition temperature greater than 46° C.

DETAILED DESCRIPTION

The present invention relates to polymeric interlayers suitable for use in a variety of applications. When used to form multiple layer panels, including laminated glass panels, interlayers according to various embodiments of the present invention exhibit an unexpected combination of enhanced rigidity and good impact performance, while maintaining suitable optical properties, including low haze and low yellowness. As a result, multiple layer panels according to embodiments of the present invention can be used in a wide variety of applications, including architectural applications, as both structural and aesthetic elements.

As used herein, the term "interlayer" refers to a single or multiple layer polymer sheet suitable for use in forming a multiple layer panel. Multiple layer panels are typically formed by sandwiching the interlayer between two substrates, which can be formed from a rigid material such as glass, and laminating the assembly to form a multiple layer laminated panel. Multiple layer panels may be formed using a single layer or multiple layer interlayer. As used herein, the terms "single layer" and "monolithic" refer to interlayers formed of one single polymer layer, while the terms "multiple layer" or "multilayer" refer to interlayers having two or more polymer layers adjacent to and in contact with one another. Each polymer layer of an interlayer may include one or more polymeric resins, optionally combined with one or more plasticizers, which have been formed into a sheet. One or more of the polymer layers may further include additional additives, although these are not required.

The polymeric resin or resins utilized in polymer layers as described herein may comprise one or more thermoplastic polymer resins. In some embodiments, the thermoplastic resin or resins may be present in the polymer layer in an amount of at least about 50, at least about 55, at least about 60, at least about 65, at least about 70, at least about 75, at least about 80, at least about 85, at least about 90, or at least about 95 weight percent, based on the total weight of the polymer layer. When two or more resins are present, each may be present in an amount of at least about 0.5, at least about 1, at least about 2, at least about 5, at least about 10, at least about 15, at least about 20, at least about 25, at least about 30, at least about 35, at least about 40, at least about 45, or at least about 50 weight percent, based on the total weight of the polymer layer.

Examples of suitable thermoplastic polymers can include, but are not limited to, polyvinyl acetal polymers (PVA) (such as poly(vinyl butyral) (PVB) or poly(vinyl isobutyral), an isomer of poly(vinyl butyral) and also referred as PVB or PVisoB, aliphatic polyurethanes (PU), poly(ethylene-co-vinyl acetate) (EVA), poly(vinyl chlorides) (PVC), poly(vinylchloride-co-methacrylate), polyethylenes, polyolefins, silicone elastomers, epoxy resins, ethylene acrylate ester copolymers, poly(ethylene-co-butyl acrylate), and acid copolymers such as ethylene/carboxylic acid copolymers and its ionomers, derived from any of the foregoing possible thermoplastic resins, combinations of the foregoing, and the like. Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inc. of Woburn, Mass.), EVA polymers (or copolymers) can contain various amounts of vinyl acetate groups. The desirable vinyl acetate content is generally from about 10 to about 90 mol %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont, Wilmington, Del.). In some embodiments, the thermoplastic polymer can be selected from the group consisting of poly(vinyl acetal) resins, poly(vinyl chloride), poly(ethylene-co-vinyl) acetates, and polyurethanes, while in other embodiments, the polymer can comprise one or more poly(vinyl acetal) resins. When an interlayer includes more than one polymer layer, each layer may include the same type of thermoplastic polymer resin, or one or more layers may include at least one different type of resin. Further, although generally described herein with respect to poly(vinyl acetal) resins, it should be understood that one or more of the above polymers could be included in addition to, or in the place of, the poly(vinyl acetal) resins described below in accordance with various embodiments of the present invention.

Thermoplastic polymer resins may be formed by any suitable method. When the thermoplastic polymer resins include poly(vinyl acetal) resins, such resins may be formed by acetalization of poly(vinyl alcohol) with one or more aldehydes in the presence of a catalyst according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.). The resulting poly(vinyl acetal) resins may include at least about 50, at least about 60, at least about 70, at least about 75, at least about 80, at least about 85, or at least about 90 weight percent of residues of at least one aldehyde, measured according to ASTM 1396 as the percent acetalization of the resin. The total amount of aldehyde residues in a poly(vinyl acetal) resin can be collectively referred to as the acetal content, with the balance of the poly(vinyl acetal) resin being residual hydroxyl groups (as vinyl hydroxyl groups) and residual ester groups (as vinyl acetate groups), which will be discussed in further detail below.

Suitable poly(vinyl acetal) resins may include residues of any aldehyde and, in some embodiments, may include residues of at least one $C_4$ to $C_8$ aldehyde. Examples of suitable $C_4$ to $C_8$ aldehydes can include, for example, n-butyraldehyde, i-butyraldehyde (also referred to as iso-butyraldehyde), 2-methylvaleraldehyde, n-hexyl aldehyde, 2-ethylhexyl aldehyde, n-octyl aldehyde, and combinations thereof. One or more of the poly(vinyl acetal) resins utilized in the layers and interlayers described herein can include at least about 20, at least about 30, at least about 40, at least about 50, at least about 60, or at least about 70 weight percent of residues of at least one $C_4$ to $C_8$ aldehyde, based on the total weight of aldehyde residues of the resin. Alternatively, or in addition, the poly(vinyl acetal) resin may include not more than about 99, not more than about 95, not more than about 90, not more than about 85, not more than about 80, not more than about 75, not more than about 70, or not more than about 65 weight percent of at least one $C_4$ to $C_8$ aldehyde. The $C_4$ to $C_8$ aldehyde may be selected from the group listed above, or it can be selected from the group consisting of n-butyraldehyde, i-butyraldehyde, 2-ethylhexyl aldehyde, and combinations thereof.

In various embodiments, the poly(vinyl acetal) resin may be a poly(vinyl butyral) (PVB) resin that primarily comprises residues of n-butyraldehyde, and may, for example, include not more than about 30, not more than about 20, not more than about 10, not more than about 5, not more than about 2, or not more than 1 weight percent of residues of an aldehyde other than n-butyraldehyde. Typically, the aldehyde residues other than n-butyraldehyde present in poly(vinyl butyral) resins may include iso-butyraldehyde, 2-ethylhexyl aldehyde, and combinations thereof. When the poly(vinyl acetal) resin comprises a poly(vinyl butyral) resin, the weight average molecular weight of the resin can be at least about 30,000, at least about 40,000, at least about 50,000, at least about 65,000, at least about 75,000, at least about 85,000, at least about 100,000, or at least about 125,000 Daltons and/or not more than about 500,000, not more than about 450,000, not more than about 300,000, not more than about 350,000, not more than about 300,000, not more than about 250,000, not more than about 200,000, not more than about 170,000, not more than about 160,000, not more than about 155,000, not more than about 150,000, not more than about 140,000, or not more than about 135,000 Daltons, measured by size exclusion chromatography using low angle laser light scattering (SEC/LALLS) method of Cotts and Ouano in tetrahydrofuran.

In general, poly(vinyl acetal) resins can be produced by hydrolyzing a poly(vinyl acetate) to poly(vinyl alcohol), and then acetalizing the poly(vinyl alcohol) with one or more of the above aldehydes to form a poly(vinyl acetal) resin. In the process of hydrolyzing the poly(vinyl acetate), not all the acetate groups are converted to hydroxyl groups, and, as a result, residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl groups) and residual acetate groups (as vinyl acetate groups) as part of the polymer chain. As used herein, the terms "residual hydroxyl content" and "residual acetate content" refer to the amount of hydroxyl and acetate groups, respectively, that remain on a resin after processing is complete. Both the residual hydroxyl content and the residual acetate content are expressed in weight percent, based on the weight of the polymer resin, and are measured according to ASTM D-1396.

The poly(vinyl acetal) resins utilized in one or more polymer layers as described herein may have a residual hydroxyl content of at least about 8, at least about 8.5, at least about 9, at least about 10, at least about 11, at least about 12, at least about 13, at least about 14, at least about 15, at least about 16, at least about 17, at least about 18, at least about 18.5, at least about 19, at least about 20, at least about 21, at least about 22, at least about 23, at least about 24, at least about 25, at least about 26, at least about 27, at least about 28, at least about 29, at least about 30, at least about 31, at least about 32, or at least about 33 weight percent or more. Additionally, the poly(vinyl acetal) resin or resins utilized in polymer layers of the present invention may have a residual hydroxyl content of not more than about 45, not more than about 43, not more than about 40, not more than about 37, not more than about 35, not more than about 34, not more than about 33, not more than about 32, not more than about 31, not more than about 30, not more than about 29, not more than about 28, not more than about 27, not more than about 26, not more than about 25, not more than about 24, not more than about 23, not more than about 22, not more than about 21, not more than about 20, not more than about 19, not more than about 18.5, not more than about 18, not more than about 17, not more than about 16, not more than about 15, not more than about 14, not more than about 13, not more than about 12, not more than about 11, or not more than about 10 weight percent. Other residual hydroxyl contents may be used or selected as desired depending on the application and desired properties.

When a polymer layer or interlayer includes more than one type of poly(vinyl acetal) resin, each of the poly(vinyl acetal) resins may have substantially the same residual hydroxyl contents, or one or more of the poly(vinyl acetal) resins may have a residual hydroxyl content substantially different from one or more other poly(vinyl acetal) resins. Various embodiments of several interlayers that include more than one poly(vinyl acetal) resin are discussed in further detail below.

One or more poly(vinyl acetal) resins used in interlayers according to the present invention may have a residual acetate content of not more than about 20, not more than about 18, not more than about 15, not more than about 12, not more than about 10, not more than about 8, not more than about 6, not more than about 4, not more than about 3, or not more than about 2 weight percent. Alternatively, or in addition, at least one poly(vinyl acetal) resin used in a polymer layer or interlayer as described herein can have a residual acetate content of at least about 3, at least about 4, at least about 5, at least about 6, at least about 7, at least about 8, at least about 9, at least about 10, at least about 12, or at least about 14 weight percent or more. When a polymer layer or interlayer includes two or more poly(vinyl acetal) resins, the resins may have substantially the same residual acetate content, or one or more resins may have a residual acetate content different from the residual acetate content of one or more other poly(vinyl acetal) resins.

One or more polymer layers may also include at least one plasticizer. When present, the plasticizer content of one or more polymer layers can be at least about 2, at least about 5, at least about 6, at least about 8, at least about 10, at least about 15, at least about 20, at least about 25, at least about 30, at least about 35, at least about 40, at least about 45, at least about 50, at least about 55, at least about 60, at least about 65, at least about 70, at least about 75, or at least about 80 parts per hundred resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, not more than about 40, or not more than about 35 phr. In some embodiments, one or more polymer layers can have a plasticizer content of less than 35, not more than about 32, not more than about 30, not more than about 27, not more than about 26, not more than about 25, not more than about 24, not more than about 23, not more than about 22, not more than about 21, not more than about 20, not more than about 19, not more than about 18, not more than about 17, not more than about 16, not more than about 15, not more than about 14, not more than about 13, not more than about 12, not more than about 11, or not more than about 10 phr.

As used herein, the term "parts per hundred resin" or "phr" refers to the amount of plasticizer present per one hundred parts of resin, on a weight basis. For example, if 30 grams of plasticizer were added to 100 grams of a resin, the plasticizer content would be 30 phr. If the polymer layer includes two or more resins, the weight of plasticizer is compared to the combined amount of all resins present to determine the parts per hundred resin. Further, when the plasticizer content of a layer or interlayer is provided herein, it is provided with reference to the amount of plasticizer in the mix or melt that was used to produce the layer or interlayer, unless otherwise specified.

For layers of unknown plasticizer content, the plasticizer content can be determined via a wet chemical method in which an appropriate solvent, or mixture of solvents, is used to extract the plasticizer from the polymer layer or interlayer. Prior to extracting the plasticizer, the weight of the sample layer is measured and compared with the weight of the layer from which the plasticizer has been removed after extraction. Based on this difference, the weight of plasticizer can be determined and the plasticizer content, in phr, calculated. For multiple layer interlayers, the polymer layers can be physically separated from one another and individually analyzed according to the above procedure.

Although not wishing to be bound by theory, it is understood that, for a given type of plasticizer, the compatibility of the plasticizer in the poly(vinyl acetal) resin may be correlated to the residual hydroxyl content of the resin. More particularly, poly(vinyl acetal) resins having higher residual hydroxyl contents may generally have a reduced plasticizer compatibility or capacity, while poly(vinyl acetal) resins with a lower residual hydroxyl content may exhibit an increased plasticizer compatibility or capacity. Generally, this correlation between the residual hydroxyl content of a polymer and its plasticizer compatibility/capacity can be manipulated in order to facilitate addition of the proper amount of plasticizer to the polymer resin and to stably maintain differences in plasticizer content between multiple layers within an interlayer.

Any suitable plasticizer can be used in the polymer layers described herein. The plasticizer may have a hydrocarbon segment of at least about 6 and/or not more than about 30, not more than about 25, not more than about 20, not more than about 15, not more than about 12, or not more than about 10 carbon atoms. Examples of plasticizers include esters of a polybasic acid or a polyhydric alcohol, among others. More specific examples of suitable plasticizers include, but are not limited to, triethylene glycol di-(2-ethylhexanoate) ("3GEH"), triethylene glycol di-(2-ethylbutyrate), tetraethylene glycol di-(2-ethylhexanoate) ("4GEH"), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. In some embodiments, the plasticizer may comprise, or consist of, 3GEH. Other examples of plasticizers can include phosphate esters, epoxidized oil, solid state plasticizers, fire retardant plasticizers, and combinations thereof.

Additionally, one or more polymer layers of the present invention may include at least one plasticizer having a refractive index greater than about 1.460, or greater than 1.470, or greater than 1.480. Examples of such plasticizers can include, but are not limited to, esters of a polybasic acid or a polyhydric alcohol, polyadipates, epoxides, phthalates, terephthalates, benzoates, toluates, mellitates and other specialty plasticizers. Further examples include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In some embodiments, the plasticizer can be selected from the group consisting of dipropylene glycol dibenzoates, tripropylene glycol dibenzoates, and combinations thereof.

Additionally, at least one of the polymer layers may also include other types of additives that can impart particular properties or features to the polymer layer or interlayer. Such additives can include, but are not limited to, adhesion control agents ("ACAs"), dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers. Specific types and amounts of such additives may be selected based on the final properties or end use of a particular interlayer.

The polymer layers described herein may exhibit a wide range of glass transition temperatures. In some embodiments, interlayers including two or more polymers or polymer layers can exhibit two or more glass transition temperatures. The glass transition temperature ($T_g$) of a polymeric material is the temperature that marks the transition of the material from a glass state to a rubbery state. The glass transition temperatures of the polymer layers can be determined by dynamic mechanical thermal analysis (DMTA) according to the following procedure. A polymer sheet is molded into a sample disc of 25 millimeters (mm) in diameter. The polymer sample disc is placed between two 25-mm diameter parallel plate test fixtures of a Rheometrics Dynamic Spectrometer II. The polymer sample disc is tested in shear mode at an oscillation frequency of 1 Hertz as the temperature of the sample is increased from −20 to 70° C. at a rate of 2° C./minute. The position of the maximum value of tan delta (damping) plotted as dependent on temperature is used to determine the glass transition temperature. Experience indicates that the method is reproducible to within +/−1° C.

Interlayers as described herein may include at least one polymer layer having a glass transition temperature of at least about −5, at least about −2, at least about −1, at least about 0, at least about 1, at least about 2, at least about 5, at least about 10, at least about 15, at least about 20, at least about 25, at least about 27, at least about 30, at least about 32, at least about 33, at least about 35, at least about 36, at least about 37, at least about 38, at least about 40, at least about 41, at least about 42, at least about 43, at least about 44, at least about 45, at least about 46, at least about 47, at least about 48, at least about 49, at least about 50, at least about 51, at least about 52, at least about 53, at least about 54, or at least about 55° C. or more. While there is no maximum glass transition temperature in some embodiments, in other embodiments, the polymer layer can have a glass transition temperature of not more than about 80, not more than about 78, not more than about 75, not more than about 70, not more than about 65, not more than about 64, not more than about 63, not more than about 62, not more than about 61, not more than about 60, not more than about 59, not more than about 58, not more than about 57, not more than about 56, not more than about 55, not more than about 54, not more than about 53, not more than about 52, not more than about 51, not more than about 50, not more than about 49, not more than about 48, not more than about 47, not more than about 46, not more than about 45, not more than about 44, not more than about 43, not more than about 42, not more than about 41, not more than about 40, not more than about 39, not more than about 38, not more than about 37, not more than about 36, not more than about 35, not more than about 34, not more than about 33, not more than about 32, not more than about 30, not more than about 25, not more than about 20, not more than about 15, not more than about 10, not more than about 5, not more than about 2, not more than about 1, not more than about 0, or not more than about −1° C. When a polymer layer or interlayer includes two or more polymer layers, at least one of the layers may have a glass transition temperature different from one or more other polymer layers within the interlayer. Other glass transition temperature(s) may be selected depending on the desired properties and application. Various embodiments of multiple layer interlayers will be discussed in further detail shortly.

According to some embodiments of the present invention, the interlayer may be a single layer, or monolithic, interlayer. When the interlayer is a monolithic interlayer, the single polymer layer may include at least one poly(vinyl acetal) resin and at least one plasticizer. The poly(vinyl acetal) resin may have properties that fall within one or more of the ranges, and the plasticizer may be of the type and in the amounts described above. For example, in some embodiments, the poly(vinyl acetal) resin can have a residual hydroxyl content of at least about 19, at least about 20, at least about 21, at least about 22, at least about 23, at least about 24, at least about 25, at least about 26, at least about 27, at least about 28, at least about 29, or at least about 30 weight percent and/or not more than about 45, not more than about 43, not more than about 40, not more than about 37, not more than about 35, not more than about 34, not more than about 33, or not more than about 32 weight percent.

In some embodiments, the amount of plasticizer in the single polymer layer interlayer can be not more than about 30, not more than about 27, not more than about 26, not more than about 25, not more than about 24, not more than about 23, not more than about 22, not more than about 21, not more than about 20, not more than about 19, not more than about 18, not more than about 17, not more than about 16, not more than about 15, not more than about 14, not more than about 13, not more than about 12, not more than about 11, or not more than about 10 phr. In some embodiments, the plasticizer content can be at least about 2, at least about 5, at least about 6, at least about 8, or at least about 10 phr, while, in other embodiments, the plasticizer content may be at or near zero.

Additionally, the single polymer layer interlayer may have a glass transition temperature greater than 43, at least about 44, at least about 45, greater than 46, at least about 47, at least about 48, at least about 49, at least about 50, at least about 51, at least about 52, at least about 53, at least about 54, at least about 55, or at least about 56, at least about 60, at least about 65, at least about 70, at least about 75, at least about 80, at least about 85, at least about 90, at least about 95, or at least about 100° C. or more. In some embodiments, at least two properties selected from the group consisting of residual hydroxyl content of the poly(vinyl acetal) resin, plasticizer content, and glass transition temperature for a single polymer layer may fall within the above ranges, while, in other embodiments, the residual hydroxyl content of the poly(vinyl acetal) resin, the plasticizer content, and the glass transition temperature for the single polymer layer may fall within one or more of the ranges described herein.

Whether single or multiple layer, interlayers according to various embodiments of the present invention may include at least two different polymers. When the layer or interlayer includes more than one polymer, each polymer may be present in an amount of at least about 0.5, at least about 1, at least about 2, at least about 5, at least about 10, at least about 15, at least about 20, at least about 30, at least about 40, or at least about 45 weight percent, based on the combined weight of all polymers present in the layer or interlayer. Additionally, one or more of the polymers may be present in the interlayer in an amount of not more than about 45, not more than about 40, not more than about 35, not more than about 30, not more than about 25, not more than about 20, not more than about 18, not more than about 15, not more than about 10, not more than about 8, or not more than about 5 weight percent, based on the total weight of the polymer layer or interlayer, and together, the polymers can make up at least about 10, at least about 20, at least about 30, at least about 40, at least about 50, at least about 60, at least about 70, or at least about 80 weight percent of a layer or interlayer, based on the combined weight of all components. According to some embodiments, the total amount of components other than the polymers described herein present in a layer or interlayer can be not more than about 20, not more than about 15, not more than about 10, not more than about 5, not more than about 2, or not more than about 1 weight percent, based on the combined weight of all components of the layer or interlayer.

When present, the two or more different polymers may include at least a first poly(vinyl acetal) resin and a second poly(vinyl acetal) resin. The first and second poly(vinyl acetal) resins may be present in adjacent layers of a multiple layer interlayer, or the first and second poly(vinyl acetal) resins may be physically mixed with one another so as to form a blended polymer layer or interlayer. As used herein, the terms "first," "second," "third," and the like are used to describe various elements, but such elements should not be unnecessarily limited by these terms. These terms are only used to distinguish one element from another and do not necessarily imply a specific order or even a specific element. For example, an element may be regarded as a "first" element in the description and a "second" element in the claims without being inconsistent. Consistency is maintained within the description and for each independent claims, but such nomenclature is not necessarily intended to be consistent therebetween.

When present, the first and second poly(vinyl acetal) resins can have different compositions. For example, in some embodiments, the first poly(vinyl acetal) resin can have a residual hydroxyl content that is at least about 2, at least about 3, at least about 4, at least about 5, at least about 6, at least about 7, at least about 8, at least about 9, at least about 10, at least about 12, at least about 13, at least about 14, at least about 15, at least about 16, at least about 17, at least about 18, at least about 19, at least about 20, at least about 21, at least about 22, at least about 23, or at least about 24 weight percent different than the residual hydroxyl content of the second poly(vinyl acetal) resin. In other embodiments, the first poly(vinyl acetal) resin can have a residual hydroxyl content that is not more than about 2, not more than about 1.5, not more than about 1, or not more than about 0.5 weight percent different than the residual hydroxyl content of the second poly(vinyl acetal) resin.

Additionally, or in the alternative, the first poly(vinyl acetal) resin can have a residual acetate content that is at least about 2, at least about 3, at least about 4, at least about 5, at least about 7, at least about 8, at least about 9, at least about 10, at least about 12, at least about 13, at least about 15, at least about 18, or at least about 20 weight percent different than the residual acetate content of the second poly(vinyl acetal) resin. In other embodiments, the first poly(vinyl acetal) resin can have a residual acetate content that is not more than about 2, not more than about 1.5, not more than about 1, or not more than about 0.5 weight percent different than the residual acetate content of the second poly(vinyl acetal) resin.

As used herein, the term "weight percent different" or "the difference . . . is at least . . . weight percent" refers to a difference between two given percentages, calculated by finding the absolute value of the mathematical difference between the two numbers. A value that is "different" from a given value can be higher or lower than the given value. For example, a first poly(vinyl acetal) resin having a residual hydroxyl content that is "at least 2 weight percent different than" the residual hydroxyl content of a second poly(vinyl acetal) resin may have a residual hydroxyl content that is at least 2 weight percent higher or at least 2 weight percent lower than the second residual hydroxyl content. For example, if the residual hydroxyl content of the exemplary second poly(vinyl acetal) resin is 14 weight percent, the residual hydroxyl content of the exemplary first poly(vinyl acetal) resin can be at least 16 weight percent (e.g., at least 2 weight percent higher) or not more than 12 weight percent (e.g., at least 2 weight percent lower).

As a result of having different compositions, the portions of the layer or interlayer formed from the first poly(vinyl acetal) resin and the second poly(vinyl acetal) resin may have different properties, due to, for example, differences in plasticizer content. As described previously, when two poly (vinyl acetal) resins having different residual hydroxyl contents are blended with a plasticizer, the plasticizer may partition between the different resins, such that a higher amount of plasticizer is present in the portion of the layer or interlayer formed from the lower residual hydroxyl content resin and less plasticizer is present in the portion of the layer or interlayer formed from the higher residual hydroxyl content resin. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins.

Although not wishing to be bound by theory, it is assumed that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer polymer layer that exhibits a lower glass transition temperature than a polymer layer including a similar resin having a higher residual hydroxyl content. Depending on the specific resin and plasticizer, these trends could be reversed.

When the first and second poly(vinyl acetal) resins have different residual hydroxyl contents, the portions of the layer or interlayer formed from each of the first and second poly(vinyl acetal) resins may also include different amounts of plasticizer. As a result, each of these portions may also exhibit different properties, such as, for example, glass transition temperature. In some embodiments, the difference in plasticizer content between portions of a layer or interlayer formed from a first poly(vinyl acetal) resin and the portions of a layer or interlayer formed from a second poly(vinyl acetal) resin can be at least about 2, at least about 3, at least about 5, at least about 8, at least about 10, at least about 12, or at least about 15 phr or more, measured as described above. In other embodiments, the difference in plasticizer content between portions of a layer or interlayer formed from a first poly(vinyl acetal) resin and portions of a layer or interlayer formed from a second poly(vinyl acetal) resin can be at least about 18, at least about 20, at least about 25, at least about 30, at least about 35, at least about 40, at least about 45, at least about 50, at least about 55, at least about 60, or at least about 65 phr or more.

In addition, or in the alternative, the difference between the plasticizer content of the portion of the layer or interlayer formed from the first polymer and the portion of the layer or interlayer formed from the second polymer may be not more than about 40, not more than about 35, not more than about 30, not more than about 25, not more than about 20, not more than about 17, not more than about 15 or not more than about 12 phr. The values for the plasticizer content of the portions of the layer or interlayer formed from the first and second poly(vinyl acetal) resins may fall within one or more of the ranges provided above.

In some embodiments, the glass transition temperature of the portion of the layer or interlayer formed from the first poly(vinyl acetal) resin can be at least about 3, at least about 5, at least about 8, at least about 10, at least about 12, at least about 13, at least about 15, at least about 18, at least about 20, at least about 22, at least about 25, at least about 27, at least about 30, at least about 35, at least about 40, at least about 45, at least about 50, at least about 55, at least about 60, at least about 65, or at least about 70° C. different than the portion of the layer or interlayer formed from the second poly(vinyl acetal) resin. The values for the glass transition temperatures of the portions of the layer or interlayer formed from the first and second poly(vinyl acetal) resins may fall within one or more of the ranges provided above.

When present in a blended polymer layer or interlayer, the first and second poly(vinyl acetal) resins may be combined such that the second poly(vinyl acetal) resin is dispersed within the first poly(vinyl acetal) resin to thereby form domains of the second poly(vinyl acetal) resin within a substantially continuous phase formed from the first poly (vinyl acetal) resin. Each of the resins may be present in an amount of at least about 0.5, at least about 1, at least about 2, at least about 5, at least about 10, at least about 15, at least about 20, at least about 30, at least about 40, at least about 45, or at least about 50 weight percent, based on the combined weight of all polymers present in the layer or interlayer. According to some embodiments, the difference between the residual hydroxyl content of the first poly(vinyl acetal) resin and the residual hydroxyl content of the second poly(vinyl acetal) resin can be at least about 5, at least about 6, at least about 7, at least about 8, at least about 9, at least about 10, at least about 11, at least about 12, or at least about 13, at least about 14, at least about 15, at least about 16, at least about 17, at least about 18, at least about 19, at least about 20, at least about 21, at least about 22, at least about 23, or at least about 24 weight percent.

The blended layer can further include one or more additional polymers, such as, for example, a third poly(vinyl acetal) resin, dispersed within the first poly(vinyl acetal) resin, to thereby additionally form domains of the third poly(vinyl acetal) resin within the continuous phase of the first poly(vinyl acetal) resin. One or more other polymers in addition to the third poly(vinyl acetal) resin may also be blended into the first poly(vinyl acetal) resin, thereby forming further domains of other polymer material within the continuous phase formed by the first poly(vinyl acetal) resin. Further, additional polymer layers that include one or more additional polymers as described previously, may also be present in the interlayer, adjacent to and in contact with the blended polymer layer.

When the blended layer includes at least a first, a second, and a third poly(vinyl acetal) resin, the second and third poly(vinyl acetal) resins may be dispersed within the first poly(vinyl acetal) resin to thereby form domains of the second and third poly(vinyl acetal) resins within the continuous phase of the first poly(vinyl acetal) resin. According to some embodiments, at least one of the poly(vinyl acetal) resins can have an "intermediate" residual hydroxyl content that is lower than the residual hydroxyl content of the resin having the highest residual hydroxyl content, and higher than the residual hydroxyl content of the resin having the lowest residual hydroxyl content.

In such embodiments, the difference between the highest and lowest residual hydroxyl contents (i.e., the maximum residual hydroxyl difference) can be at least about 5, at least about 6, at least about 7, at least about 8, at least about 9, at least about 10, at least about 11, at least about 12, or at least about 13 weight percent, while the individual differences between the highest and intermediate residual hydroxyl contents and intermediate and lowest residual hydroxyl contents can be not more than about 4, not more than about 3, not more than about 2, not more than about 1 weight percent. In some embodiments, when the blended polymer layer includes at least 4, at least 5, at least 6, or at least 7 poly(vinyl acetal) resins of different residual hydroxyl contents, none of the resins may have a residual hydroxyl content that differs from the resin having the next largest and next smallest values for residual hydroxyl content by more than 1 percent, more than 2 percent, more than 3 percent, or more than 4 percent.

In some embodiments, use of one or more resins having an intermediate residual hydroxyl content as described above may help minimize haze while enhancing other properties of the interlayer, especially as the maximum residual hydroxyl difference exceeds 5 weight percent. In some embodiments, blended polymer layers may also include at least one high refractive index plasticizer having, for example, a refractive index of at least about 1.460, at least about 1.465, at least about 1.470, at least about 1.475, at least about 1.480, at least about 1.485, at least about 1.490, at least about 1.495, at least about 1.500, or at least about 1.510, measured according to ASTM D542 at a wavelength of 589 nm and 25° C. Examples of suitable high refractive index plasticizers are provided above, and at least one can be used in any amount required to achieve desirable optical and other properties in the final layer or interlayer.

When the interlayer includes first and second poly(vinyl acetal) resins that are present in two or more layers of a multilayer interlayer, one of the polymer layers can include the first poly(vinyl acetal) resin and another polymer layer can include the second poly(vinyl acetal) resin. Additional polymer layers that include one or more additional polymers, including other poly(vinyl acetal) resins, may also be present in the interlayer, adjacent to and in contact with at least one of the first and second polymer layers. When other polymers are present in additional polymer layers of an interlayer, the other polymers can be of the types and in the amounts as described previously.

In some embodiments, the interlayers described herein can include at least a first outer polymer layer and a second outer polymer layer. As used herein, the term "outer" refers to the outermost layer or layers of an interlayer. Typically, the outer polymer layers are configured to be in contact with a substrate when the interlayer is laminated to the substrate, or to one of a pair of substrates when the interlayer is used to form a multiple layer panel. In some embodiments, each of the first and second outer polymer layers can include respective first and second poly(vinyl acetal) resins and an optional plasticizer, and the resins may have residual hydroxyl contents and residual acetate contents within one or more of the ranges provided above. Similarly, each of the first and second polymer layers can include at least one plasticizer of a type and in the amounts described above, so that the layers may also have a glass transition temperature as previously described.

According to some embodiments, the first and second outer polymer layers may be adjacent to and in contact with one another, such that the first and second outer polymer layers are the only two layers of the interlayer. In other embodiments, at least 1, at least 2, at least 3, at least 4, or at least 5 or more polymer layers may be disposed between and in contact with at least one of the first and second outer polymer layers. These additional layers, when present, may have compositions similar to, or different than, each of the first and second polymer layers and may include one or more of the polymers described above. The additional layers may also be formed of other materials, such as a polymer film formed from polyethylene terephthalate (PET), and the polymer film may include various metallic, metal oxide, or other non-metallic materials or layers and may be coated or otherwise surface-treated. In some embodiments, one or more of the additional layers may comprise functional layers such including, for example, IR reducing layers, holographic layers, photochromic layers, electrochromic layers, antilacerative layers, heat strips, antennas, solar radiation blocking layers, decorative layers, and the like.

In some embodiments, the interlayer can include at least a first polymer layer, a second polymer layer, and a third polymer layer, wherein the second polymer layer is disposed between and in contact with each of the first and third polymer layers. Each of the respective first, second, and third polymer layers can include at least one poly(vinyl acetal) resin and an optional plasticizer of the types and in the amounts described in detail previously. According to some embodiments, the second, inner polymer layer can include a resin having a residual hydroxyl content higher than the residual hydroxyl contents of the poly(vinyl acetal) resins in each of the first and third polymer layers. Consequently, as the plasticizer partitions between the layers, the second inner layer may have a glass transition temperature higher than the glass transition temperatures of each of the first and third outer polymer layers. Although not wishing to be bound by theory, it is understood that this type of configuration, wherein relatively "soft" (i.e., lower glass transition temperature) outer polymer layers are sandwiching a "stiff" (i.e., relatively high glass transition temperature) inner layer, may facilitate both enhanced rigidity and impact resistance in multiple layer panels formed from the interlayer.

In some embodiments, the first and third outer polymer layers can have the same or similar compositions and/or properties. For example, in some embodiments, the poly(vinyl acetal) resin in the first polymer layer can have a residual hydroxyl content within about 2, within about 1, or within about 0.5 weight percent of the residual hydroxyl content of the poly(vinyl acetal) resin in the third polymer layer. Similarly, the poly(vinyl acetal) resins in the first and third layer can have residual acetate contents within about 2, within about 1, or within about 0.5 weight percent of one another. Additionally, the first and third outer polymer layers may have similar plasticizer contents and/or may exhibit similar glass transition temperatures. For example, the plasticizer content of the first polymer layer can be less than 2, not more than about 1, or not more than about 0.5 phr different than the plasticizer content of the third polymer layer, and/or the first and third polymer layers can have glass transition temperatures that differ by less than 2, not more than about 1, or not more than about 0.5° C.

In other embodiments, the first and third outer polymer layers can have different compositions and/or properties. For example, in some embodiments, the residual hydroxyl and/or residual acetate content of the poly(vinyl acetal) resin in the first polymer layer can be at least about 2, at least about 3, at least about 5, at least about 8, or at least about 10 weight percent and/or not more than about 20, not more than about 18, not more than about 15, not more than about 12, not more than about 10 weight percent different than the residual hydroxyl and/or residual acetate content of the poly(vinyl acetal) resin in the third polymer layer. In some embodiments, the plasticizer content of the first and third polymer layers may also differ by at least about 2, at least about 3, at least about 5, or at least about 8 phr and/or not more than about 20, not more than about 15, not more than about 12, or not more than about 10 phr. Consequently, the glass transition temperature of the first polymer layer may be at least about 2, at least about 3, at least about 5, at least about 8, or at least about 10° C. and/or not more than about 20, not more than about 15, not more than about 12, or not more than about 10° C. different than the glass transition temperature of the third polymer layer. In some embodiments, interlayers that include two outer polymer layers having different compositions and/or properties may be useful for panels exposed to widely different conditions on opposite sides of the laminate, such as, for example, architectural panels used in extreme climates.

According to some embodiments of the present invention, at least one polymer layer of a multiple layer interlayer may not include a poly(vinyl acetal) resin. Such layers can, for example, include less than about 2, less than about 1.5, less than about 1, less than about 0.5, or less than about 0.10 weight percent of poly(vinyl acetal) resins, based on the total weight of the polymer layer. Polymer layers that do not include a poly(vinyl acetal) resin may, instead, include at least one of the other polymer resins discussed in detail previously. In some embodiments, at least one of the layers of a multiple layer interlayer may include a polymer selected from the group consisting of polyurethanes (PU), poly (ethylene-co-vinyl) acetates (EVA), poly(vinyl chlorides) (PVC), cellulose esters, acid copolymers such as ethylene/ carboxylic acid copolymers and ionomers and combinations thereof, although other polymers are also possible. The polymer other than a poly(vinyl acetal) resin may exhibit different properties than a polymer layer comprising a poly(vinyl acetal) resin. For example, in some embodiments, at least a portion of the polymer layer including another polymer resin may be cross-linked, whereas polymer layers including a poly(vinyl acetal) resin generally would not be.

In some cases, such interlayers may further include one or more polymer layers that include a poly(vinyl acetal) resin, as discussed above, adjacent to and in contact with at least one layer that does not include a poly(vinyl acetal) resin. For example, in some embodiments, the interlayer may include at least one outer polymer layer comprising a poly(vinyl acetal) resin and at least one inner layer comprising a thermoplastic polymer other than a poly(vinyl acetal) resin. In embodiments, the thermoplastic polymer other than the poly(vinyl acetal) resin may have a glass transition temperature that is greater than the glass transition temperature of the poly(vinyl acetal) resin in the outer layer(s), such as greater than about 43° C., and a modulus (G') that is higher than the modulus of the outer or skin layer(s), such as greater than about 1 MPa at 50° C. In embodiments, the outer layer may have a glass transition temperature of less than about 43° C. According to such embodiments, the poly(vinyl acetal) resin may have a residual hydroxyl content of not more than about 23, not more than about 22, not more than about 21, not more than about 20, not more than about 19, not more than about 18, not more than about 17, not more than about 16.5, not more than about 16, not more than about 15.5, not more than about 15, not more than about 14.5, not more than about 14, not more than about 13.5, not more than about 13, not more than about 12.5, not more than about 12, not more than about 11.5, not more than about 11, not more than about 10.5, not more than about 10, or not more than about 9.5 weight percent, and the glass transition temperature of the outer polymer layer can be not more than about 40, not more than about 35, not more than about 33, not more than about 32, not more than about 30, not more than about 27, not more than about 25, not more than about 20, not more than about 15, not more than about 10, not more than about 5, not more than about 2, not more than about 1, not more than about 0, or not more than about −2° C.

In other embodiments, the interlayer may include at least one inner polymer layer comprising a poly(vinyl acetal) resin and at least one outer polymer layer comprising a thermoplastic polymer other than a poly(vinyl acetal) resin. In embodiments, the thermoplastic polymer other than the poly(vinyl acetal) resin may have a glass transition temperature that is less than the glass transition temperature of the poly(vinyl acetal) resin in the core layer, such as less than about 40° C., and a modulus (G') that is less than the modulus of the core layer, such as less than about 1 MPa at 50° C. In embodiments, the core layer may have a glass transition temperature of greater than about 43° C. In accordance with these embodiments, the poly(vinyl acetal) resin can have a residual hydroxyl content of at least about 10, at least about 11, at least about 12, at least about 13, at least about 14, at least about 15, at least about 16, at least about 17, at least about 18, at least about 18.5, at least about 19, at least about 19.5, at least about 20, at least about 20.5, at least about 21, at least about 21.5, at least about 22, at least about 22.5, at least about 23, at least about 23.5, at least about 24, at least about 24.5, at least about 25, at least about 25.5 weight percent, or higher.

The plasticizer content of the inner poly(vinyl acetal) resin-containing polymer layer can be less than 35, not more than about 32, not more than about 30, not more than about 27, not more than about 26, not more than about 25, not more than about 24, not more than about 23, not more than about 22, not more than about 21, not more than about 20, not more than about 19, not more than about 18, not more than about 17, not more than about 16, not more than about 15, not more than about 14, not more than about 13, not more than about 12, not more than about 11, or not more than about 10 phr, and/or the glass transition temperature can be at least about 35, at least about 36, at least about 37, at least about 38, at least about 40, at least about 41, at least about 42, at least about 43, at least about 44, at least about 45, at least about 46, at least about 47, at least about 48, at least about 49, at least about 50, at least about 51, at least about 52, at least about 53, at least about 54, or at least about 55° C.

According to embodiments wherein the interlayer includes one polymer layer comprising a poly(vinyl acetal) resin and another polymer layer comprising a resin or polymer other than a poly(vinyl acetal) resin, each layer may have different properties. For example, in some embodiments, the polymer layers may have glass transition temperatures that differ from one another by at least about 3, at least about 5, at least about 7, at least about 10, at least about 12, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, at least about 100, at least about 105, at least about 110, at least about 115, or at least about 120° C. The polymer layer including the resin other than a poly(vinyl acetal) resin can have a glass transition temperature higher or lower than the polymer layer including the poly(vinyl acetal) resin.

According to some embodiments, the glass transition temperature of the polymer layer that does not include a poly(vinyl acetal) resin can be not more than about 20, not more than about 15, not more than about 10, not more than about 5, not more than about 0, not more than about −5, not more than about −10, not more than about −15, not more than about −20, not more than about −25, not more than about −30, not more than about −35, or not more than about −40° C. Alternatively, or in addition, the glass transition temperature of the polymer layer that does not include a poly(vinyl acetal) resin can be at least about −50, at least about −45, at least about −40, at least about −35, at least about −30, at least about −25, at least about −20, at least about −15, at least about −10, at least about −5, at least about 0, or at least about 5° C., or it can be in the range of from −50 to 0° C., from −45 to −10° C., or −40 to −20° C. Other glass transition temperatures are also possible and, in some embodiments, the glass transition temperature of the polymer layer including the poly(vinyl acetal) resin and/or the polymer layer that does not include a poly(vinyl acetal) resin can be within one or more of the ranges described above.

Interlayers according to various embodiments of the present invention may exhibit enhanced properties as compared to conventional interlayers. For example, in contrast to comparative interlayers used for architectural applications, interlayers as described herein may exhibit both high rigidity and good impact performance, while still retaining suitable optical characteristics. As a result, interlayers as described herein may suitably be utilized in many structural and load-bearing applications, subject to various pressures, temperature changes, and impacts, while maintaining both suitable performance and aesthetic value and properties.

Interlayers as described herein may exhibit an enhanced rigidity. Rigidity of a polymer layer or interlayer may be characterized by its shear storage modulus (G'), measured at 50° C. according to ASTM D4065-12. In some embodiments, a polymer layer or interlayer as described herein may have a shear storage modulus (G') at 50° C. of at least about 2, at least about 3, at least about 3.5, at least about 4, at least about 4.5, at least about 5, at least about 5.5, at least about 6, at least about 6.5, or at least about 7 MPa. There is no particular upper limit, although practically, the layer or interlayer may exhibit a shear storage modulus as high as 7.5 MPa or even as high as 8 MPa or more at 50° C.

The rigidity of the interlayer may also be characterized according to its three-point bending stiffness. The three-point bending stiffness, as described herein, is measured for an interlayer having a thickness of 30 mils when the interlayer is laminated between two sheets of 2.3-mm thick clear glass, according to ASTM D790 at room temperature. In some embodiments, the interlayer can have a three-point bending stiffness of at least about 100, at least about 105, at least about 110, at least about 115, at least about 120, at least about 125, at least about 130, at least about 135, at least about 140, at least about 145, at least about 150, at least about 155, at least about 160, at least about 170, at least about 180, at least about 190, at least about 200, at least about 210, at least about 220, at least about 230, at least about 240, at least about 250, at least about 260, at least about 270, at least about 280, at least about 290, or at least about 300 N/mm.

In addition to enhanced rigidity, interlayers according to embodiments of the present invention can exhibit desirable impact resistance, as characterized by the mean break height of the interlayer, when having a thickness of between 30 and 60 mils and when laminated between two sheets of 2.3-mm thick clear glass, measured according to ANSI/SAE Z26.1-1996 at a temperature of about 70° F. (about 21° C.). In some embodiments, the interlayers as described herein can have a mean break height, measured as described above, of at least about 13, at least about 13.5, at least about 14, at least about 14.5, at least about 15, at least about 15.5, at least about 16, at least about 16.5, at least about 17, at least about 17.5, at least about 18, at least about 18.5, at least about 19, at least about 19.5, at least about 20, at least about 20.5, at least about 21, at least about 21.5, at least about 22, at least about 22.5, at least about 23, at least about 23.5, at least about 24, at least about 24.5, or at least about 25 feet, at least about 25.5, at least about 26, at least about 26.5, at least about 27, at least about 27.5, at least about 28, or at least about 28.5 feet or more. Mean break height can also be measured at other thicknesses. In embodiments, the higher the mean break height, the better.

The values for mean break height provided herein are obtained using an interlayer having a known thickness (as indicated), such as 30 mils, 45 mils, or other thickness, laminated between two 2.3-mm thick sheets of glass. The specification of values for these parameters is not intended to, in any way, limit the thickness of the interlayers described herein or the configuration of multiple layer panels according to embodiments of the present invention. Rather, specification of values for these parameters is intended to provide a definite test for determining the impact resistance, measured as mean break height, exhibited by an interlayer, and the test is measured at a known thickness and if necessary, normalized to a constant thickness (such as 30 mils or 45 mils) so that different interlayers can be compared at the same interlayer thickness.

Interlayers of the present invention may be used to form panels that exhibit a mean break height greater than the mean break height of similar panels formed from a comparative interlayer. As used herein, the term "comparative interlayer" refers to a monolithic interlayer formed from a poly(vinyl butyral) resin having a residual hydroxyl content of 18.7 weight percent and a residual acetate content of less than 2 percent plasticized with 20 phr of 3GEH plasticizer. In some embodiments, a single or multiple layer interlayer as described herein may exhibit a mean break height that it at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, or at least about 90 percent higher than the mean break height of a comparative interlayer having the same thickness.

Additionally, interlayers of the present invention have the capability of maintaining acceptable levels of creep resistance, when laminated between two glass sheets to form a multiple layer panel. For example, interlayers of the present invention may exhibit a creep of not more than about 1 mm, not more than about 0.9 mm, not more than about 0.8 mm, not more than about 0.7 mm, not more than about 0.6 mm, not more than about 0.5 mm, or not more than about 0.4 mm, when measured at a temperature of 100° C. for 1000 hours, according to the following procedure. A 6-inch by 6-inch interlayer to be tested is laminated between two sheets of 2.3-mm thick clear glass, one having dimensions of 6 inches by 6 inches and the other having dimensions of 6 inches by 7 inches. The resulting glass panel is hung by the exposed 1-inch section of glass in an oven set at a temperature of 100° C. The specimen is removed from the oven at predetermined intervals of 100 hours, 250 hours, 500 hours, and 1000 hours. At each interval, the panel is analyzed to determine how far (in mm) the smaller (6-inch by 6-inch) sheet of glass has moved from its original position relative to the larger (6-inch by 7-inch) sheet of glass.

Pummel adhesion is another parameter that may be used to describe the interlayers disclosed herein. The Pummel Adhesion Test measures the adhesion level of glass to the interlayer in a laminate construction. The interlayer to glass adhesion has a large effect on the impact resistance and long term stability of glass-interlayer structures. In this test, the laminates are cooled to 0° F. (−18° C.) and manually pummeled with a 1 lb. (0.45 kg) hammer on a steel plate at a 45° angle. The samples are then allowed to come to room temperature and all broken glass unadhered to the interlayer is then removed. The amount of glass left adhered to the interlayer is visually compared with a set of standards. The standards correspond to a scale in which varying degrees of glass remained adhered to the interlayer. For example, at a pummel standard of zero, essentially no glass is left adhered to the interlayer. On the other hand, at a pummel standard of ten, essentially 100 percent of the glass remains adhered to the interlayer. Pummel values are grouped and averaged for like specimens. Reported values state the average pummel value for the group and the maximum range of the pummel adhesion rating for individual surfaces. The interlayers described herein may have a pummel adhesion rating of 2 or greater, or 9 or less, or from about 2 to about 9.

In addition to enhanced rigidity and impact performance, interlayers according to embodiments of the present invention also exhibit suitable optical properties, which may vary depending on the ultimate end use. Clarity is one parameter used to describe the optical performance of the interlayers described herein and may be determined by measuring haze value or percent. Haze value represents the quantification of light scattered by a sample in contrast to the incident light. The test for determining haze value is performed with a hazemeter, such as a Model D25 Hazemeter commercially available from Hunter Associates (Reston, Va.), on a polymer sample which has been laminated between two sheets of clear glass, each having a thickness of 2.3 mm.

When the interlayer is used in a multiple layer panel for which a high level of optical clarity is desired, such as, for example, in clear windows or windshields, the interlayer may be transparent or nearly transparent. In some embodiments, interlayers of the present invention may have a haze value of less than about 3, less than about 2, less than about 1 percent, as measured in accordance with ASTM D1003-61 (reapproved 1977)—Procedure B using Illuminant C, at an observer angle of 2 degrees. In other embodiments, when haze is less important, the interlayer may have a higher haze value, such as, for example, at least about 25, at least about 30, or at least about 40 percent.

Another parameter used to determine the optical performance is percent visual transmittance (% $T_{vis}$), which is measured on the HunterLab UltraScan XE, commercially available from Hunter Associates (Reston, Va.). The values may be obtained by analyzing a polymer sample which has been laminated between two sheets of clear glass, each having a thickness of 2.3 mm (commercially available from Pittsburgh Glass Works of Pennsylvania). In some embodiments, when clear multiple layer panels are desired, the interlayers of the present invention can have a percent visual transmittance of at least about 80, at least about 81, at least about 82, at least about 83, at least about 84, at least about 85, at least about 85.5, at least about 86, at least about 86.5, at least about 87, at least about 87.5, or at least about 88, at least about 88.5 percent or higher.

In embodiments when the transparency and/or haze of the interlayer is not as important, the interlayer, or panel formed therefrom, may be translucent, at least partially opaque, or totally opaque. Examples of applications for such panels include privacy glass or other similar end uses. According to some embodiments, such an interlayer may have, for example a haze value greater than about 30 percent. Alternatively, or in addition, the interlayer may have a visual transmittance of least about 2 percent, at least about 5 percent, at least about 10 percent and/or not more than about 40 percent, not more than about 35 percent, or not more than about 30 percent. Additionally, in some embodiments, the interlayers as described herein may have a reflectance (% R) greater than 5 percent, at least about 10 percent, or at least about 15 percent and/or not more than about 50, not more than about 45, or not more than about 40 percent, measured according to ASTM E-1164. Other values of reflectance, transmittance, and haze may also be possible, depending on the particular end use. Further, the levels of reflectance, transmittance, and haze may be controlled according to any suitable method including, for example, inclusion of additives, colorants, dyes, and other similar components.

Alternatively, or in addition, the layers, and interlayers as described herein may have a mottle value of not more than 4, not more than 3, not more than 2, or not more than about 1. Mottle is another measure of optical quality, which is detected as a texture or graininess. Mottle is a visual defect that is visible if the level of texture or graininess is too high or too severe, thereby causing objectionable visual appearance. Mottle is assessed and categorized by a side-by-side qualitative comparison of shadowgraph projections for a test laminate with a set of standard laminate shadowgraphs that represent a series, or scale, of mottle values ranging from 1 to 4, with 1 representing a standard of low mottle (i.e., a low number of disruptions) and 4 representing a standard of high mottle (i.e., a high number of disruptions). High mottle is generally considered objectionable, particularly in automotive and architectural applications. Optionally, a model laminate having a single layer interlayer with zero mottle (no mottle) is used to facilitate the evaluation in a test laminate that has a mottle rating lower than the scale of the standard set, such as lower than a rating of 1. A test laminate that shows a shadowgraph projection similar to that of a zero-mottle laminate is assessed to have a mottle rating of zero.

When the interlayer includes two or more resins, including, for example, two or more poly(vinyl acetal) resins, the refractive index (RI) of each of the resins can be matched to prevent haze or other optical defects from appearing in the resulting interlayer. Also, when the interlayer includes two or more layers, including, for example, two or more poly (vinyl acetal) layers, the refractive index (RI) of each of the layers can be matched to prevent haze or other optical defects from appearing in the resulting interlayer. In some embodiments, the polymer resins may be selected such that the maximum difference between the individual refractive indices of the polymers is less than 0.010 units. For example, if an interlayer included three polymer resins, the difference between the refractive index of the first resin and the refractive index of the second resin, the difference between the refractive index of the second resin and the refractive index of the third resin, and the difference between the refractive index of the first resin and the refractive index of the third resin would each be less than 0.010. In some embodiments, one or more RI balancing agents may be included in at least one polymer layer of the interlayer to help facilitate RI matching of the various polymers and/or the various layers. In some embodiments, the RI balancing agent can include at least one of the high refractive index plasticizers listed above, while, in other embodiments, the RI balancing agent can be another component, such as, for example a solid additive selected from the group consisting of polyadipates, polystyrene having a molecular weight of less than 2500, epoxides, phthalic acid esters, benzoic acid esters, and combinations thereof.

The interlayers of the present invention can be formed according to any suitable method. Exemplary methods can include, but are not limited to, solution casting, compression molding, injection molding, melt extrusion, melt blowing, and combinations thereof. Multilayer interlayers including two or more polymer layers may also be produced according to any suitable method such as, for example, co-extrusion, blown film, melt blowing, dip coating, solution coating, blade, paddle, air-knife, printing, powder coating, spray coating, lamination, and combinations thereof.

According to various embodiments of the present invention, the layers or interlayers may be formed by extrusion or co-extrusion. In an extrusion process, one or more thermoplastic resin(s), plasticizer(s), and, optionally, one or more additives as described previously, can be pre-mixed and fed into an extrusion device. The extrusion device is configured to impart a particular profile shape to the thermoplastic composition in order to create an extruded sheet. The extruded sheet, which is at an elevated temperature and highly viscous throughout, can then be cooled to form a polymeric sheet. Once the sheet has been cooled and set, it may be cut and rolled for subsequent storage, transportation, and/or use as an interlayer.

Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

The overall average thickness of interlayers according to various embodiments of the present invention can be at least about 10, at least about 15, at least about 20, at least about 25, at least about 30, or at least about 35 mils and/or not more than about 120, not more than about 100, not more than about 90, not more than about 75, not more than about 60, not more than about 50, not more than about 45, not more than about 40, not more than about 35, not more than about 32 mils, although other thicknesses are possible depending on the application and desired properties. If the interlayer is not laminated between two substrates, its average thickness can be determined by directly measuring the thickness of the interlayer using a caliper, or other equivalent device. If the interlayer is laminated between two substrates, its thickness can be determined by subtracting the combined thickness of the substrates from the total thickness of the multiple layer panel. Although the above refer to thicknesses of an individual interlayer, it should be understood that two or more individual interlayers can be stacked or otherwise assembled together to form a composite interlayer having a greater thickness, which may then be laminated between various types of substrates for certain end use applications.

In some embodiments, one or more polymer layers can have an average thickness of at least about 1, at least about 2, at least about 3, at least about 4, at least about 5, at least about 6, at least about 7, at least about 8, at least about 9, or at least about 10 mils. Additionally, or in the alternative, one or more of the polymer layers in an interlayer as described herein can have an average thickness of not more than about 25, not more than about 20, not more than about 15, not more than about 12, not more than about 10, not more than about 8, not more than about 6, or not more than about 5 mils.

When the interlayer includes two or more layers having different glass transition temperatures, the ratio of the average thickness of the layer with the highest glass transition temperature (i.e., "the stiffest layer") to the average thickness of the layer with the lowest glass transition temperature (i.e., "the softest layer") can be at least about 0.5:1, at least about 0.75:1, at least about 1:1, at least about 2:1, at least about 3:1, at least about 4:1, at least about 5:1, at least about 8:1, at least about 10:1, at least about 15:1, at least about 20:1, at least about 25:1, at least about 50:1, at least about 75:1, or at least about 100:1 and/or not more than about 1000:1, not more than about 750:1, not more than about 500:1, not more than about 300:1, not more than about 250:1, not more than about 150:1, not more than about 100:1, not more than about 50:1, not more than about 25:1, not more than about 15:1, not more than about 10:1, not more than about 5:1, or not more than about 2:1. Where the interlayer includes more than one "soft" layer and/or more than one "stiff" layer, the ratio of the combined average thickness of all stiff layers to the combined average thickness of all soft layers may also fall within one or more of the ranges above.

In some embodiments, the polymer layers or interlayers can comprise flat polymer layers having substantially the same thickness along the length of the sheet. In other embodiments, one or more layers of an interlayer can be wedge-shaped or can have a wedge-shaped profile, such that the thickness of the interlayer changes along the length of the sheet and one edge of the layer or interlayer has a thickness greater than the other. When the interlayer is a multilayer interlayer, at least one, at least two, or at least three of the layers of the interlayer can be wedge-shaped.

The interlayer may be a tapered interlayer that includes a tapered zone of varying thickness. The tapered zone may form only a portion of the interlayer, or the entire interlayer may be tapered. When the entire interlayer is tapered, the tapered zone width is equal to the interlayer width and the first and second boundaries of the tapered zone are located at the first and second terminal edges, respectively. The interlayer may include a tapered zone extending entirely from a first terminal edge of the interlayer to a second terminal edge of the interlayer. The interlayer may have a constant wedge angle $\theta_c$ that is greater than the overall wedge angle of the entire tapered zone. The interlayer may include a tapered zone located between the first and second flat edge zones. The interlayer may be an interlayer that does not include any flat end portions, but rather has a tapered zone that forms the entire interlayer.

The tapered interlayer can include one or more constant angle tapered zones, each having a width that is less than the overall width of the entire tapered zone. Each tapered zone can have a wedge angle that is the same as or different from the overall wedge angle of the entire tapered zone. For example, the tapered zone can include one, two, three, four, five or more constant angle tapered zones. When multiple constant angle tapered zones are employed, the constant angle tapered zones can be separated from one another by variable angle tapered zones that serve to transition between adjacent constant angle tapered zones.

In certain embodiments, the width of each constant angle tapered zone can be at least about 2, at least about 5, at least about 10, at least about 15, or at least about 20 cm and/or not more than about 150, not more than about 100, or not more than about 50 cm. In certain embodiments, the ratio of the width of each constant angle tapered zone to the overall width of the entire tapered zone can be at least about 0.1:1, at least about 0.2:1, at least about 0.3:1 or at least about 0.4:1 and/or not more than about 0.9:1, not more than about 0.8:1, not more than about 0.7:1, not more than about 0.6:1, or not more than about 0.5:1.

In certain embodiments, the wedge angle of each constant angle tapered zone can be at least about 0.13, at least about 0.15, at least about 0.20, at least about 0.25, at least about 0.30, at least about 0.35, at least about 0.40 mrad and/or not more than about 1.2, not more than about 1.0, not more than about 0.90, not more than about 0.85, not more than about 0.80, not more than about 0.75, not more than about 0.70, not more than about 0.65, or not more than about 0.60 mrad. Further, the wedge angle of each constant angle tapered zone can be in the range of 0.13 to 1.2 mrad, 0.25 to 0.75 mrad, or 0.40 to 0.60 mrad. In certain embodiments, the wedge angle of at least one constant angle tapered zone is at least about 0.01, at least about 0.05, at least about 0.10, at least about 0.20, at least about 0.30, or at least about 0.40 mrad greater than the overall wedge angle of the entire tapered zone. In certain embodiments, the wedge angle of at least one constant angle tapered zone is at least about 0.01, at least about 0.05, at least about 0.10, at least about 0.20, at least about 0.30, or at least about 0.40 mrad less than the overall wedge angle of the entire tapered zone. In certain embodiments, the wedge angle of at least one constant angle tapered zone is not more than about 0.40, not more than about 0.30, not more than about 0.20, not more than about 0.10, not more than about 0.05, or not more than about 0.01 mrad greater than the overall wedge angle of the entire tapered zone. In certain embodiments, the wedge angle of at least one constant angle tapered zone is not more than about 0.40, not more than about 0.30, not more than about 0.20, not more than about 0.10, not more than about 0.05, or not more than about 0.01 mrad less than the overall wedge angle of the entire tapered zone.

Interlayers according to various embodiments of the present invention may be utilized in a multiple layer panel comprising an interlayer and at least one substrate onto which the interlayer is laminated. Any suitable substrate may be used and in some embodiments may be selected from the group consisting of glass, polycarbonate, acrylic, and combinations thereof. In general, neither of the substrates in a multiple layer panel are formed from a thermoplastic polymeric material, but, instead from more rigid and generally transparent materials such as those listed above. However, in other embodiments, the multiple layer panel may include only one rigid substrate, an interlayer and at least one polymer film disposed on the layer or interlayer, forming a multiple layer panel referred to as a "bilayer." In some embodiments, the interlayer utilized in a bilayer may include a multilayer interlayer, while in other embodiments, a monolithic interlayer may be used. In other embodiments, a polymer film may be included in a multiple layer panel having two rigid substrates, where the polymer film(s) may be between two layers of interlayer, such as encapsulated between two layers of interlayer. The use of a polymer film in multiple layer panels as described herein may enhance the optical character of the final panel, while also providing other performance improvements, such as infrared absorption. Polymer films differ from polymer layers or interlayers in that the films alone do not provide the necessary penetration resistance and glass retention properties. The polymer film is generally thinner than the sheet, and may generally have a thickness in the range of from 0.001 to 0.25 mm. Poly(ethylene terephthalate) ("PET") is one example of a material used to form the polymer film. Examples of suitable bilayer constructs include: (glass)//(interlayer)//(film) and (glass)//(interlayer)//(coated film). Examples of other constructs that are not bilayers where a polymer film may be used include: (glass)//(interlayer)//(film)//(interlayer)// (glass) and (glass)//(interlayer)//(film)//(multiple layer interlayer)//(glass) where the polymer film may have coatings or any other functional layer(s), as previously described.

The interlayers of the present disclosure will most commonly be utilized in multiple layer panels comprising two substrates, such as, for example, a pair of glass sheets, with the interlayers disposed between the two substrates. An example of such a construct would be: (glass)//(interlayer)// (glass), where the interlayer can include a monolithic or multiple layered interlayer as described herein. As previously described, the construct may also include one or more polymer films if desired, and each interlayer may be a monolithic or multiple layer interlayer as desired. The thicknesses of the substrates can be in the range of from 0.5 mm to 5 mm or more and each of the panels can have the same thickness, or the panels can have different thicknesses.

The typical glass lamination process comprises the following steps: (1) assembly of the two substrates and the interlayer(s); (2) heating the assembly via an IR radiant or convective device for a first, short period of time; (3) passing the assembly into a pressure nip roll for the first de-airing; (4) heating the assembly for a short period of time (such as to about 60° C. to about 120° C.) to give the assembly enough temporary adhesion to seal the edge of the interlayer; (5) passing the assembly into a second pressure nip roll to further seal the edge of the interlayer and allow further handling; and (6) autoclaving the assembly at an appropriate temperature (such as between 135° C. and 150° C.) and pressure (such as between 150 psig and 200 psig) for an appropriate time (such as about 30 to 90 minutes), depending on the actual construct and materials used. Other methods for de-airing the interlayer-glass interface, as described according to one embodiment in steps (2) through (5) above include vacuum bag and vacuum ring processes, and both may also be used to form interlayers of the present invention as described herein.

The panels can be used for a variety of end use applications, including, for example, for automotive, railroad, marine, or aircraft windshields and windows, structural architectural panels in buildings or stadiums, decorative architectural panels, hurricane glass, bulletproof glass, and other similar applications. Examples of suitable architectural applications for panels according to embodiments of the present invention can include, but are not limited to, indoor or outdoor stairs or platforms, pavement or sidewalk skylights, ballustrades, curtain walls, flooring, balconies, single side balconies, canopies, support beams, glass fins (that may be decorative and/or support structures), support columns, windows, doors, skylights, privacy screens, shower doors, and the like.

The following examples are intended to be illustrative of the present invention in order to teach one of ordinary skill in the art to make and use various embodiments of the invention and are not intended to limit the scope of the invention in any way.

EXAMPLES

Example 1

Comparative Panels CP-1 to CP-3 were formed by laminating three different 60-mil thick monolithic interlayers formed from a poly(vinyl butyral) resin having a residual hydroxyl content of about 18.7 weight percent plasticized with various amounts of 3GEH plasticizer (as shown in Table 1) between two 2.3-mm thick sheets of glass. The mean break height of each of Comparative Panels CP-1 to CP-3 was measured according to ANSI/SAE Z26.1-1996 at a temperature of about 70° F. The results are provided in Table 1, below.

TABLE 1

MEAN BREAK HEIGHT

| Panel | Plasticizer Content (phr) | $T_g$ (° C.) | MBH (ft) |
|---|---|---|---|
| CP-1 | 20 | 43 | 19 |
| CP-2 | 15 | 50 | 13 |
| CP-3 | 10 | 56 | 10 |

As shown by the reduction in mean break height from 19 for panel CP-1 to 10 for panel CP-3 in Table 1, above, reduction of the plasticizer content of a polymer interlayer alone in order to increase its glass transition temperature results in a multiple layer panel that exhibits lower impact resistance and is therefore a more brittle panel. As the plasticizer level was reduced from 20 to 15 to 10 phr, the glass transition temperature was successfully increased from 43 to 50 to 56, but the impact strength of the panel (as measured by mean break height ("MBH")) was significantly reduced (almost in half from 19 ft to 10 ft) when the plasticizer level was reduced from 20 phr to 10 phr. Further improvements are necessary to increase the glass transition temperature of the interlayer without losing the impact strength.

Example 2

Comparative Panel (CP-4) was formed in a similar manner as described in Example 1, above, by laminating two 30-mil thick monolithic interlayers, each formed from a poly(vinyl butyral) resin having a residual hydroxyl content of about 18.7 weight percent that had been plasticized with 20 phr of 3GEH plasticizer, between two 2.3-mm thick sheets of clear glass. Disclosed Panels DP-1 and DP-2 were formed in a similar manner except that the interlayer used was a tri-layer interlayer having relatively soft outer polymer layers sandwiching a stiffer inner polymer layer. Disclosed Panels DP-1 and DP-2 each included an interlayer having a pair of 15-mil thick outer layers formed from poly(vinyl butyral) having a residual hydroxyl content of about 18.7 weight percent and plasticized with 30 phr (DP-1) or 20 phr (DP-2) of 3GEH plasticizer, and a 20-mil thick inner layer formed from poly(vinyl butyral) resin having a residual hydroxyl content of about 21.5 weight percent, plasticized with 10 phr of 3GEH plasticizer.

The specific configurations of each of the interlayers used to form panels DP-1, DP-2 and CP-4 are summarized in Table 2, below. The mean break height of each of the panels was measured according to ANSI/SAE Z26.1-1996 at a temperature of about 70° F., and the results are provided in Table 2, below.

As shown in Table 2, above, Disclosed Panels DP-1 and DP-2 containing 50-mil thick tri-layer interlayers having a stiffer inner layer exhibited better impact strength, as shown by a greater MBH value, than Comparative Panel, CP-4, which was formed using a pair of single layer interlayers of the same composition to produce an interlayer 60 mils thick (which when laminated, is effectively a 60 mils thick monolithic interlayer). The interlayers used to form Disclosed Panels DP-1 and DP-2 were thinner overall (50 mils) than the interlayer used to form Comparative Panel CP-4 (60 mils), but they had significantly better impact performance as shown by the much higher MBH values. The average plasticizer level in DP-1 was 22 phr, and in DP-2 it was 16 phr.

Example 3

Another Comparative Panel, CP-5, was formed by laminating a 30-mil thick monolithic interlayer formed from poly(vinyl butyral) resin having a residual hydroxyl content of about 18.7 weight percent plasticized with 20 phr of 3GEH plasticizer between two sheets of 2.3-mm thick clear glass. Similarly, additional Disclosed Panels, DP-3, DP-3* and DP-4, were formed by laminating different multilayer (tri-layer) interlayer combinations between two 2.3-mm thick sheets of clear glass in a similar manner. The tri-layer interlayers had outer and inner layers comprising resins having different levels of residual hydroxyl content and different plasticizer levels. The specific configurations of each of the tri-layer interlayers used to form Disclosed Panels DP-3, DP-3* and DP-45 are summarized in Table 3, below. The MBH and three-point bending stiffness at 50° C. (instead of room temperature, according to ASTM D790) of Comparative Panel CP-5 and each of Disclosed Panels DP-3, DP-3* and DP-4 was then measured according to ANSI/SAE Z26.1-1996 at a temperature of about 70° F. The results of these tests are provided in Table 3, below.

TABLE 2

MEAN BREAK HEIGHT

| | Outer Layers | | | Inner Layers | | | Total | |
|---|---|---|---|---|---|---|---|---|
| Panel | PVOH (%) | Plasticizer (phr) | Thickness (mils) | PVOH (%) | Plasticizer (phr) | Thickness (mils) | Thickness (gauge) | MBH (ft) |
| CP-4 | 18.7 | 20 | 30 | — | — | — | 60 | 20 |
| DP-1 | 18.7 | 30 | 15 | 21.5 | 10 | 20 | 50 | >40* |
| DP-2 | 18.7 | 20 | 15 | 21.5 | 10 | 20 | 50 | >40* |

*did not break through at 40 feet

TABLE 3

MEAN BREAK HEIGHT

| Panel | skin OH | skin Phr | each skin thickness (2 skin layers) | core OH | core Phr | core thickness | nominal total thickness | MBH | Delta OH | Bending Stiffness N/mm at 50° C. | Ave. phr |
|---|---|---|---|---|---|---|---|---|---|---|---|
| CP-5 | 18.7 | 20 | — | — | — | — | 30 | 17.8 | 0 | 54 | 20 |
| DP-3 | 16 | 30 | 7.5 | 24 | 10 | 15 | 30 | 21 | 8 | 57 | 20 |
| DP-3* | 16 | 30 | 7.5 | 24 | 10 | 15 | 30 | 23 | 8 | 57 | 20 |
| DP-4 | 11 | 40 | 5 | 27 | 10 | 20 | 30 | 24 | 16 | 57 | 20 |

*DP-3* was made at the same time as DP-3 but was aged for one month at room temperature before being tested to determine the effect of aging on the sample As shown by Table 3, impact level (as shown by MBH) can be increased significantly by varying the compositions of the outer (skin) and inner (core) layers of tri-layer interlayers. DP-3, DP-3* and DP-4 were made using different hydroxyl level PVB compositions in the skins and core resulting in softer skin layers compared to the core composition. Comparative Panel CP-5, which had a monolithic 30-mil thick interlayer having 20 phr plasticizer and a resin having about 18.7 weight percent residual hydroxyl level, had a MBH of almost 18 ft. Disclosed Panels DP-3, DP-3* and DP-4, which were made from interlayers having different residual hydroxyl levels in the skin and core layers, have the same average plasticizer loading, same overall thickness and similar measured bending stiffness at 50° C. as CP-5, all have higher MBH values (21, 23 and 24 feet respectively).

Example 4

An additional Comparative Panel, CP-6, was formed by laminating a 30-mil thick monolithic interlayer formed from poly(vinyl butyral) resin having a residual hydroxyl content of about 18.7 weight percent plasticized with 15 phr of 3GEH plasticizer between two sheets of 2.3-mm thick clear glass. Similarly, additional Disclosed Panels, DP-5 to DP-9, were formed by laminating different multilayer (tri-layer) interlayer combinations between two 2.3-mm thick sheets of clear glass in a similar manner. The tri-layer interlayers had outer and inner layers comprising resins having different levels of residual hydroxyl content and different plasticizer levels. However, the average plasticizer level in the additional Disclosed Panels DP-5 to DP-9 was kept at 15 phr, the same level as Comparative Panel CP-6. The specific configurations are summarized in Table 4, below. The mean break height of Comparative Panel CP-6 and each of Disclosed Panels DP-5 to DP-9 was then measured according to ANSI/SAE Z26.1-1996 at a temperature of about 70° F. The specific configurations of each of the tri-layer interlayers used to form Disclosed Panels DP-5 to DP-9 and the results of the tests are provided in Table 4, below.

TABLE 4

Mean Break Height

| Panel | skin OH | skin Phr | each skin thickness (two skin layers) | core OH | core Phr | core thickness | nominal total thickness | MBH | Delta OH | Ave. phr | Ave. OH level |
|---|---|---|---|---|---|---|---|---|---|---|---|
| CP-6 | 18.7 | 15 | — | — | — | — | 30 | 10 | 0 | 15 | 18.7 |
| DP-5 | 18.7 | 20 | 7.5 | 27 | 10 | 15 | 30 | 15 | 8 | 15 | 22.9 |
| DP-6 | 16 | 20 | 7.5 | 27 | 10 | 15 | 30 | 16.4 | 11 | 15 | 21.5 |
| DP-7 | 16 | 20 | 7.5 | 24 | 10 | 15 | 30 | 18.8 | 8 | 15 | 20.0 |
| DP-8 | 11 | 20 | 7.5 | 24 | 10 | 15 | 30 | 27.8 | 13 | 15 | 17.5 |
| DP-9 | 11 | 40 | 2.5 | 27 | 10 | 25 | 30 | 21.8 | 16 | 15 | 24.3 |

As shown by Table 4, impact level (as shown by MBH) can be increased significantly by varying the compositions of the outer (skin) and inner (core) layers of tri-layer interlayers. Comparative Panel CP-6, which had a 30-mil thick monolithic interlayer having 15 phr plasticizer and a resin having about 18.7 weight percent residual hydroxyl level, had a mean break height of about 10 ft. Disclosed Panels DP-5 to DP-7 and DP-9 have the same average plasticizer loading and same total thickness as CP-6, and the average residual hydroxyl level is consistently higher than CP-6, yet they all have higher MBH values ranging from 15 ft. to about 22 ft. DP-8, which also has the same plasticizer loading and thickness as CP-6, has lower average residual hydroxyl level, but also has a higher MBH than CP-6. Disclosed Panels DP-5 to DP-9 were all made using different hydroxyl level PVB compositions in the skins versus the core resulting in a softer skin layers compared to the core composition. The tri-layer formulations of DP-5 to DP-9 all have softer skins layers to improve impact strength (and increase MBH) but stiffer cores than the monolithic formulation of CP-6 to maintain overall stiffness of the interlayer.

Example 5

Additional panels were constructed and tested as follows. Comparative Panel CP-7 was formed by laminating two 30-mil thick single (monolithic) layer interlayers (to form a 60-mil thick interlayer) formed from poly(vinyl butyral) resin having a residual hydroxyl content of 18.7 weight percent plasticized with 20 phr of 3GEH plasticizer between two 2.3-mm thick sheets of clear glass. Disclosed Panels, DP-10 to DP-12 were formed using interlayers that included a pair of outer layers formed from ethylene (vinyl acetate)

(EVA) (commercially available as VISTASOLAR 520-78 from TPI All Seasons Company) instead of poly(vinyl butyral) resin. The glass transition temperature ($T_g$) of the outer layers was between −40° C. and −20° C. The inner layer of the interlayers used to form Disclosed Panels DP-10 to DP-12 included a poly(vinyl butyral) resin having a residual hydroxyl content of 18.7 weight percent, plasticized with varying amounts of 3GEH plasticizer as shown below in Table 5. The specific configurations of each of the interlayers used to form Disclosed Panels DP-10 to DP-12 are summarized in Table 5, below.

TABLE 5

MEAN BREAK HEIGHT

| Panel | Panel Type/ Configuration | Outer Layer Thickness (mils) | Inner Layer PVOH (%) | Inner Layer Plasticizer (phr) | Inner Layer Thickness (mils) | Total Thickness (mils) | MBH (ft) |
|---|---|---|---|---|---|---|---|
| CP-7 | PVB | 30 | 18.7 | 20 | — | 60 | 19.3 |
| DP-10 | EVA/PVB/EVA | 18 | 18.7 | 20 | 30 | 66 | >40 |
| DP-11 | EVA/PVB/EVA | 18 | 18.7 | 15 | 30 | 66 | >40 |
| DP-12 | EVA/PVB/EVA | 18 | 18.7 | 10 | 30 | 66 | >40 |

As shown in Table 5, above, Disclosed Panels DP-10 to DP-12, which were formed from the tri-layer interlayers having a stiffer inner PVB layer and outer layers formed from EVA, exhibited better impact resistance, as shown by a greater mean break height, than Comparative Panel, CP-7, which was formed a single layer interlayer. In fact, the mean break height of Disclosed Panels DP-10 to DP-12 was more than double the mean break height of Comparative Panel CP-7.

Example 6

Several more multiple layer panels were formed by laminating monolithic interlayers formed from plasticized poly(vinyl butyral) resin between two 2.3-mm thick sheets of glass. Comparative Panel CP-8 was formed using a 30-mil thick monolithic interlayer that included poly(vinyl butyral) resin having a residual hydroxyl content of 18.7 weight percent plasticized with 20 phr of 3GEH plasticizer and having a glass transition temperature of 43° C. Disclosed Panels DP-13 to DP-19 were also formed in a similar manner using 30-mil thick monolithic interlayers formed from poly(vinyl butyral) resins each having a different residual hydroxyl content and 20 phr of 3GEH plasticizer. The glass transition temperature and shear storage modulus (G') at 50° C., measured according to ASTM D-4065, for each interlayer used to form Disclosed Panels DP-13 to DP-19 is summarized in Table 6, below. The MBH of each of Comparative Panel CP-8 and Disclosed Panels DP-13 to DP-19 was measured according to ANSI/SAE Z26.1-1996 at a temperature of about 70° F., and the results are also provided in Table 6, below.

TABLE 6

MEAN BREAK HEIGHT

| Panel | PVOH (wt %) | Plasticizer Content (phr) | $T_g$ (° C.) | G' (MPa at 50° C.) | MBH (ft) |
|---|---|---|---|---|---|
| CP-8 | 18.7 | 20 | 43 | 1 | 14-20 |
| DP-13 | 24.3 | 20 | 47 | 2.5-3 | 14-16.8 |
| DP-14 | 25.6 | 20 | 48 | 4 | NT |
| DP-15 | 26.6 | 20 | 48.5 | 4.5 | NT |
| DP-16 | 27.2 | 20 | 50 | 4.7-5.2 | 15-18.5 |
| DP-17 | 27.2 | 22 | 49 | 4.2 | 19.4 |
| DP-18 | 28.3 | 20 | 50 | 5.3 | NT |
| DP-19 | 31.3 | 20 | 51.5 | 9.4 | NT |

*NT—not tested
*Note that for samples where ranges of G' and MBH are shown, multiple samples were tested and the range represents the spread of the results (low to high results)

Table 6 shows that as the residual hydroxyl content is increased, the $T_g$ and G' also increased, but the impact performance (as shown by MBH) was maintained and not lost as would normally be expected for samples having higher $T_g$ and G' at 50° C. values. Comparing Disclosed Panels DP-13 to DP-19 to Comparative Panel CP-8 shows that monolithic interlayers with a significantly higher $T_g$ and G' at 50° C. can be used to produce panels having similar MBH values.

Example 7

Comparative Panel CP-9 and Disclosed Panels DP-20 to DP-22 were formed in a similar manner as discussed previously by laminating various 30-mil thick monolithic interlayers between two sheets of 2.3-mm thick glass. Comparative Panel CP-9 was formed using an interlayer formed from a poly(vinyl butyral) resin having a residual hydroxyl content of 24 weight percent plasticized with 15 phr of 3GEH plasticizer. Disclosed Panels DP-20 to DP-22 were formed from various blends of two (DP-20 and DP-21) or three (DP-22) poly(vinyl butyral) resins, each having a different residual hydroxyl content. The amounts and residual hydroxyl contents of each of the resins in the blends in the interlayers used to form DP-20 to DP-22 are summarized in Table 7, below. The MBH of each of the panels was measured according to ANSI/SAE Z26.1-1996 at a temperature of about 70° F., and the results are also provided in Table 7, below.

TABLE 7

MEAN BREAK HEIGHT

| | | Resin 1 | | Resin 2 | | Resin 3 | | |
|---|---|---|---|---|---|---|---|---|
| Panel | Plasticizer (phr) | PVOH (wt %) | Amount (wt %) | PVOH (wt %) | Amount (wt %) | PVOH (wt %) | Amount (wt %) | MBH (ft) |
| CP-9 | 15 | 24 | 100 | — | — | — | — | 9.3 |
| DP-20 | 15 | 24 | 95 | 10.5 | 5 | — | — | 9.8 |
| DP-21 | 15 | 24 | 90 | 10.5 | 10 | — | — | 10.1 |
| DP-22 | 15 | 24 | 33.3 | 22 | 33.3 | 19 | 33.4 | 11 |

As shown in Table 7, above, blending one or more poly(vinyl butyral) resins having a lower hydroxyl content with at least one poly(vinyl butyral) having a higher residual hydroxyl content can help increase the impact strength (as shown by MBH) of multiple layer panels formed from the blended interlayer composition. Further, as shown by comparing the MBH values of each of Disclosed Panels DP-20 to DP-22, using blends of poly(vinyl butyral) resins having different residual hydroxyl levels can positively affect, and improve, the impact performance of the resulting panel. Additionally, blending three resins having different levels of residual hydroxyl contents creates a synergistic effect and provides a panel having the highest MBH at the same thickness and plasticizer level as the panels having interlayers with only one or two resins.

Example 8

Since stiffer interlayers are often required for architectural applications such as windows and doors, hurricane impact testing was performed on panels having different configurations of skin and core thicknesses and resins with different residual hydroxyl levels. The panels were constructed in the same manner as described in the previous examples. Comparative Panels CP-10 to CP-13 and Disclosed Panel DP-23 were constructed using various interlayers (as shown in Table 8). The multilayer interlayers and were made by assembling three multilayer (tri-layer) coextruded sheets of 30 mils (0.030 inch) each to form one 90 mils (0.090 inch) thick sheet, while the panels comprising monolithic interlayers were made by assembling three monolithic sheets of 30 mils (0.030 inch) each to form one 90 mils (0.090 inch) thick sheet.

TABLE 8

PANEL CONSTRUCTIONS

| Panel | Skin layer % OH | Skin layer phr | Skin thickness (mil) | Core layer % OH | Core layer phr | Core thickness (mil) | Total thickness (mil) | Monolithic or Multilayer |
|---|---|---|---|---|---|---|---|---|
| CP-10 | 18.7 | 20 | — | — | — | — | 90 | Monolithic |
| CP-11 | 18.7 | 38 | — | — | — | — | 90 | Monolithic |
| CP-12 | 18.7 | 25 | 75 | 24 | 10 | 15 | 90 | Multilayer |
| CP-13 | 16 | 20 | 75 | 24 | 10 | 15 | 90 | Multilayer |
| DP-23 | 16 | 30 | 75 | 24 | 10 | 15 | 90 | Multilayer |

The panels shown in Table 8 were then tested for Impact (MBH, EN12600 1B1 and Hurricane tests) and three-point Bending Stiffness at room temperature (ASTM D790), and results are shown in Table 9 below.

TABLE 9

IMPACT RESULTS

| Panel (construction) | Impact MBH (ft) | Bending Stiffness (N/mm) at room temp. | EN12600 1B1 Impact (3 mm glass) | Hurricane Impact at 90 mils (0.090 inch) |
|---|---|---|---|---|
| CP-10 | 16-18 | 239 | Pass | Fail |
| CP-11 | 18 | 61 | Pass | Pass |
| CP-12 | 17 | 241 | Pass | Fail |
| CP-13 | 19 | 250 | Pass | Fail |
| DP-23 | 21 | 130 | Pass | Pass |

Table 9 shows that while all of the panels (having 90 mils (0.090 inch) thick interlayer) passed the EN12600 1B1 impact test and had MBH values between 16 and 21 feet, only two of the samples passed the hurricane impact test requirements (CP-11 and DP-23). Comparative Panel CP-11 passed but had a very low bending stiffness of 61 N/mm, and it would not be suitable in applications also requiring structural performance, while Disclosed Panel DP-23 had a much higher bending stiffness of 130 N/mm as well as a MBH of 21 feet. Compare CP-13 to DP-23, where the tri-layers were co-extruded using the same resins in the skin and core layers with different plasticizer levels. Disclosed Panel DP-23 had softer skin layers (30 phr of plasticizer) and passed both impact tests and had a MBH of 21 feet, while Comparative Panel CP-13 had stiffer skin layers (20 phr of plasticizer), failed the hurricane impact test and had a lower MBH (19 feet). Additionally, the bending stiffness of CP-13 was very high (250 N/mm), therefore Comparative Panel CP-13 was much stiffer than Disclosed Panel DP-23.

Additional Comparative Panels CP-14 and CP-15 and Disclosed Panels DP-24 to DP-29 were constructed and tested for Hurricane Impact in the same way as previously described. The specific interlayer and panel constructions and the impact test results (Pass/Fail) are shown in Table 10 below.

TABLE 10

HURRICANE IMPACT TEST

| Panel (construction) | Thickness (mil) | Hurricane Impact (Pass/Fail) |
|---|---|---|
| CP-14 (3 layers of 30 mil PVB, 27 wt. % OH resin and 22 phr plasticizer) | 90 | Fail |
| CP-15 (3 layers of 30 mil PVB, 18.7 wt. % OH resin and 38 phr plasticizer) | 90 | Fail |
| DP-24 (1 layer of 15 mil PVB, 18.7 wt. % OH resin and 25 phr plasticizer (skin layer), 1 layer of 30 mil PVB, 27 wt. % OH resin and 20 phr plasticizer (core layer), and 1 layer of 30 mil PVB, 18.7 wt. % OH resin and 25 phr plasticizer (skin layer)) | 90 | Pass |
| DP-25 (1 layer of 30 mil PVB, 18.7 wt. % OH resin and 25 phr plasticizer (skin layer), 1 layer of 30 mil PVB, 27 wt. % OH resin and 20 phr plasticizer (core layer), and 1 layer of 0.15 mil PVB, 18.7 wt. % OH and 25 phr plasticizer (skin layer)) | 75 | Pass |
| DP-26 (2 layers of 30 mil PVB, 18.7 wt. % OH resin and 25 phr plasticizer (skin layers), 1 layer of 30 mil PVB, 27 wt. % OH resin and 20 phr plasticizer (core layer)) | 90 | Pass |
| DP-27 (2 layers of 30 mil PVB, 18.7 wt. % OH resin and 25 phr plasticizer (skin layers), 1 layer of 30 mil PVB, 27 wt. % OH resin and 22 phr plasticizer (core layer)) | 90 | Pass |
| DP-28 (2 layers of 15 mil PVB, 18.7 wt. % OH resin and 25 phr plasticizer (skin layers), 1 layer of 15 mil PVB, 27 wt. % OH resin and 22 phr plasticizer and 1 layer of 30 mil PVB, 27 wt. % OH resin and 20 phr plasticizer (core layers)) | 75 | Pass |
| DP-29 (2 layers of 15 mil PVB, 18.7 wt. % OH resin and 25 phr plasticizer (skin layers), 1 layer of 15 mil PVB, 27 wt. % OH resin and 20 phr plasticizer and 1 layer of 30 mil PVB, 27 wt. % OH resin and 20 phr plasticizer (core layers)) | 75 | Pass |

Table 10 shows that panels made with tri-layers having core layers with higher residual hydroxyl level content and lower plasticizer levels and skin layers made from lower residual hydroxyl level resins and higher levels of plasticizer can be produced so that the panels pass the hurricane impact test. Compare Comparative Panels CP-14 and CP-15 to Disclosed Panels DP-24 to DP-29. Panel CP-14 is made from three monolithic layers comprising the same (high OH) PVB resin that is used in the core layers of the Disclosed Panels, while panel CP-15 is made from three monolithic layers comprising the same (lower OH) PVB resin that is used in the skin layers of the Disclosed Panels. Comparative Panels CP-14 and CP-15 both failed the hurricane impact test, while Disclosed Panels DP-24 to DP-29, which combine various thickness skin and core layers made from different resins and plasticizer amounts all pass the hurricane impact test. Additionally, Disclosed Panels DP-24, DP-25, DP-28 and DP-29 all have a lower overall interlayer thickness (75 mils vs. 90 mils) and still pass the hurricane impact test. By combining two or more resins having different hydroxyl levels and lower plasticizer levels in the core layers, panels having desirable structural properties and impact performance can be made.

Example 9

Comparative Panels CP-16 to CP-19 and Disclosed Panels DP-30 to DP-35 were formed in a similar manner as discussed previously by laminating various interlayers between two sheets of 2.3-mm thick glass. Comparative Panels CP-16 and CP-17 were control samples of commercially available hurricane PVB (Saflex™ Storm or Saflex™ VS02 hurricane PVB interlayer having a composite interlayer with two 35 mil PVB layers (18.7 wt. % OH and 30 phr 3GEH plasticizer) encapsulating a 7 mil PET layer). Comparative Panels CP-18 to CP-20 were formed using two 30 mil layers of PVB (27.8 wt. % OH and 20 phr 3GEH plasticizer) as outer layers (layer B) and two 15 mil layers of PVB (18.7 wt. % OH and 30 phr 3GEH plasticizer) inner layers (layer A) to have a BAAB construction 90 mils thick. Disclosed Panels DP-30 to DP-35 were formed from various combinations of layers A and B (previously described) in the combinations shown in Table 11 to form 90 mil thick interlayers. Hurricane impact testing was performed on the panels having different configurations of stiffer and softer skin or outer layers and inner layers. Results are shown in Table 11 below.

TABLE 11

IMPACT RESULTS

| Panel (construction)/configuration | Total Thickness (mil) | Hurricane Impact (Pass/Fail) |
|---|---|---|
| CP-16 (control) | 75 | Pass |
| CP-17 (control) | 75 | Pass |
| DP-30 (ABBA) | 90 | Pass |
| DP-31 (ABBA) | 90 | Pass |

TABLE 11-continued

IMPACT RESULTS

| Panel (construction)/configuration | Total Thickness (mil) | Hurricane Impact (Pass/Fail) |
|---|---|---|
| DP-32 (ABAB) | 90 | Pass |
| DP-33 (ABAB) | 90 | Pass |
| DP-34 (BABA) | 90 | Pass |
| DP-35 (BABA) | 90 | Pass |
| CP-18 (BAAB) | 90 | Fail*[1] |
| CP-19 (BAAB) | 90 | Fail*[2] |
| CP-20 (BAAB) | 90 | Fail*[1] |

*[1]Missile completely penetrated lite
*[2](2) 1" × 1" tears

Table 11 shows that panels made with at least one softer skin layer (i.e., Layer A) can be produced so that the panels pass the hurricane impact test. Compare Comparative Panels CP-18 to CP-20 to Disclosed Panels DP-30 to DP-35. Panels CP-18 to CP-20 are made from the same layers (A and B) that are used in the Disclosed Panels DP-30 to DP-35, but they are layered in a different order and have the stiffer ("B" layers) as the outer or skin layers, while panels DP-30 to DP-35 are made so that at least one, and some cases both, outer or skin layer is softer (the "A" layer). Comparative Panels CP-16 and CP-17 were control samples of hurricane PVB interlayers 75 mils thick, and both passed the hurricane impact test. Comparative Panels CP-18 to CP-20 all failed the hurricane impact test, while Disclosed Panels DP-30 to DP-35, which have various combinations of skin and core layers with at least one softer skin layer all pass the hurricane impact test. Panels having interlayer configurations where both outer layers comprise softer layers (DP-30 and DP-31), as well as interlayer configurations where one outer layer is a softer layer all passed the hurricane impact test. Additionally, as shown by comparing panels DP-32 and DP-33 to DP-34 and DP-35, the orientation of the softer layer (whether closest to the side impacted or furthest away from the side impacted) did not matter as both configurations (ABAB and BABA orientations) passed the hurricane impact test.

It is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

The invention claimed is:

1. A monolithic interlayer comprising:
a single polymer layer comprising at least one poly(vinyl acetal) resin and at least one plasticizer, wherein said poly(vinyl acetal) resin has a residual hydroxyl content in the range of 24 to 32 weight percent, wherein said polymer layer has a plasticizer content of not more than 25 phr and a glass transition temperature greater than 50° C.

2. The interlayer of claim 1, wherein said plasticizer content is at least 5 phr and wherein said glass transition temperature is greater than 50° C.

3. The interlayer of claim 1, wherein said poly(vinyl acetal) resin has a residual acetate content of not more than 10 weight percent.

4. The interlayer of claim 1, wherein said residual hydroxyl content is in the range of 25 to 30 weight percent, wherein said plasticizer content is not more than 22 phr, and wherein said glass transition temperature is greater than 50° C.

5. The interlayer of claim 1, wherein said wherein said poly(vinyl acetal) resin has a residual hydroxyl content of at least 27 weight percent.

6. The interlayer of claim 1, wherein when said interlayer is laminated between two sheets of glass each having a thickness of 2.3 mm to form a laminate, the laminate has a mean break height, measured according to ANSI/SAE Z26.1-1996 at a temperature of 70° F. and an interlayer thickness of 30 mils, of at least 14 feet.

7. The interlayer of claim 1, wherein said interlayer has a 3-point bending stiffness of at least 150 N/mm, measured according to ASTM D-790 at room temperature, when the interlayer has a thickness of 30 mils and is laminated between two sheets of 2.3-mm thick clear glass.

8. A multiple layer panel comprising a pair of substrates and said interlayer of claim 1.

9. A monolithic interlayer comprising:
a single polymer layer comprising at least one poly(vinyl acetal) resin and at least one plasticizer, wherein each of criteria (i) to (iii) are true
(i) said poly(vinyl acetal) resin has a residual hydroxyl of 24 to 32 weight percent;
(ii) said polymer layer has a plasticizer content of less than 25 phr; and
(iii) said polymer layer has a glass transition temperature greater than 46° C., wherein said polymer layer has a shear storage modulus of at least 2.5 MPa, measured according to ASTM D4065-12 at 50° C., and wherein when said interlayer is laminated between two sheets of glass each having a thickness of 2.3 mm to form a laminate, the laminate has a mean break height, measured according to ANSI/SAE Z26.1-1996 at a temperature of 70° F. and an interlayer thickness of 30 mils, of at least 14 feet.

10. The interlayer of claim 9, wherein said polymer layer has a glass transition temperature greater than 50° C. and wherein said plasticizer content is at least 5 phr.

11. The interlayer of claim 9, wherein said interlayer has mean break height of at least 16 feet.

12. The interlayer of claim 9, wherein said wherein said poly(vinyl acetal) resin has a residual hydroxyl content of at least 27 weight percent.

13. The interlayer of claim 9, wherein when said interlayer having a thickness of 30 mils is laminated between two sheets of 2.3-mm thick clear glass to form a laminate, the laminate has a 3-point bending stiffness of at least 150 N/mm, measured according to ASTM D-790 at room temperature.

14. A multiple layer panel comprising a pair of substrates and said interlayer of claim 9.

* * * * *